US012725602B2

(12) United States Patent
Tani

(10) Patent No.: US 12,725,602 B2
(45) Date of Patent: Sep. 1, 2026

(54) ACTIVE NOISE REDUCTION DEVICE, ACTIVE NOISE REDUCTION SYSTEM AND ACTIVE NOISE REDUCTION METHOD

(71) Applicant: Panasonic Intellectual Property Management Co., Ltd., Osaka (JP)

(72) Inventor: Mitsuhiro Tani, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 446 days.

(21) Appl. No.: 18/232,044

(22) Filed: Aug. 9, 2023

(65) Prior Publication Data

US 2024/0071360 A1 Feb. 29, 2024

(30) Foreign Application Priority Data

Aug. 24, 2022 (JP) ................................ 2022-132994

(51) Int. Cl.
*G10K 11/178* (2006.01)

(52) U.S. Cl.
CPC .. *G10K 11/17879* (2018.01); *G10K 11/17854* (2018.01)

(58) Field of Classification Search
CPC ....... G10K 11/17854; G10K 11/17823; G10K 11/17833; G10K 2210/3056; G10K 2210/3033; G10K 2210/30232; G10K 11/178; G10K 2210/3057; G10K 2210/3054; G10K 2210/3221
See application file for complete search history.

(56) References Cited

U.S. PATENT DOCUMENTS

2008/0112569 A1* 5/2008 Asada .............. G10K 11/17833 381/71.1
2014/0105412 A1* 4/2014 Alves ............... G10K 11/17885 381/71.6
2014/0270223 A1 9/2014 Li et al.
2015/0063581 A1 3/2015 Tani et al.
2019/0130890 A1* 5/2019 Tani ................. G10K 11/17825
2020/0118538 A1 4/2020 Tani

FOREIGN PATENT DOCUMENTS

| | | |
|---|---|---|
| JP | 08-339192 | 12/1996 |
| JP | 2008-239099 | 10/2008 |
| JP | 5474750 | 4/2014 |
| JP | 6280199 | 2/2018 |
| JP | 2020-064101 | 4/2020 |
| WO | 2014/006846 | 1/2014 |
| WO | 2014/158446 | 10/2014 |

OTHER PUBLICATIONS

Office Action from Japan Patent Office (JPO) in Japanese Patent Appl. No. 2022-132994, dated Feb. 17, 2026, together with an English language translation.

* cited by examiner

*Primary Examiner* — Kile O Blair
(74) *Attorney, Agent, or Firm* — Greenblum & Bernstein, P.L.C.

(57) ABSTRACT

An active noise reduction device includes a signal processor that generates a cancelling signal for outputting a cancelling sound for reducing noise in an interior of a vehicle and a communicator that receives a change request for changing a parameter set related to generation of the cancelling signal to a user-designated parameter set that is designated by a user, and the signal processor generates the cancelling signal by using the user-designated parameter set based on the change request received.

12 Claims, 15 Drawing Sheets

ACTIVE NOISE REDUCTION DEVICE, ACTIVE NOISE REDUCTION SYSTEM AND ACTIVE NOISE REDUCTION METHOD

CROSS REFERENCE TO RELATED APPLICATION

The present application is based on and claims priority of Japanese Patent Application No. 2022-132994 filed on Aug. 24, 2022.

FIELD

The present disclosure relates to an active noise reduction system and an active noise reduction method that actively reduce noise by causing a cancelling sound to interfere with the noise.

BACKGROUND

A conventionally known active noise reduction device is an active noise reduction device that actively reduces noise by outputting, from a cancelling sound source, a cancelling sound for cancelling the noise, with the use of a reference signal having a correlation with the noise and an error signal based on a residual sound resulting from interference of the cancelling sound with the noise in a predetermined space. As an example of the active noise reduction device, Patent Literature (PTL) 1 discloses a vehicle noise control device that promptly responds to a change in an in-vehicle status of a vehicle while the vehicle is being driven and maintains an effect of noise control.

CITATION LIST

Patent Literature

PTL 1: Japanese Unexamined Patent Application Publication No. 2008-239099

SUMMARY

The present disclosure provides an active noise reduction device that is capable of improving upon the above related art.

An active noise reduction device according to an aspect of the present disclosure includes: a signal processor that generates a cancelling signal for outputting a cancelling sound for reducing noise in an interior of a moving body device, by applying an adaptive filter to a reference signal having a correlation with the noise, the adaptive filter having a coefficient that is updated based on an error signal indicating a state of the noise when the cancelling sound is being outputted; and a communicator that receives a change request for changing a parameter set related to generation of the cancelling signal to a user-designated parameter set that is designated by a user, and the signal processor generates the cancelling signal by using the user-designated parameter set based on the change request received.

The active noise reduction device according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
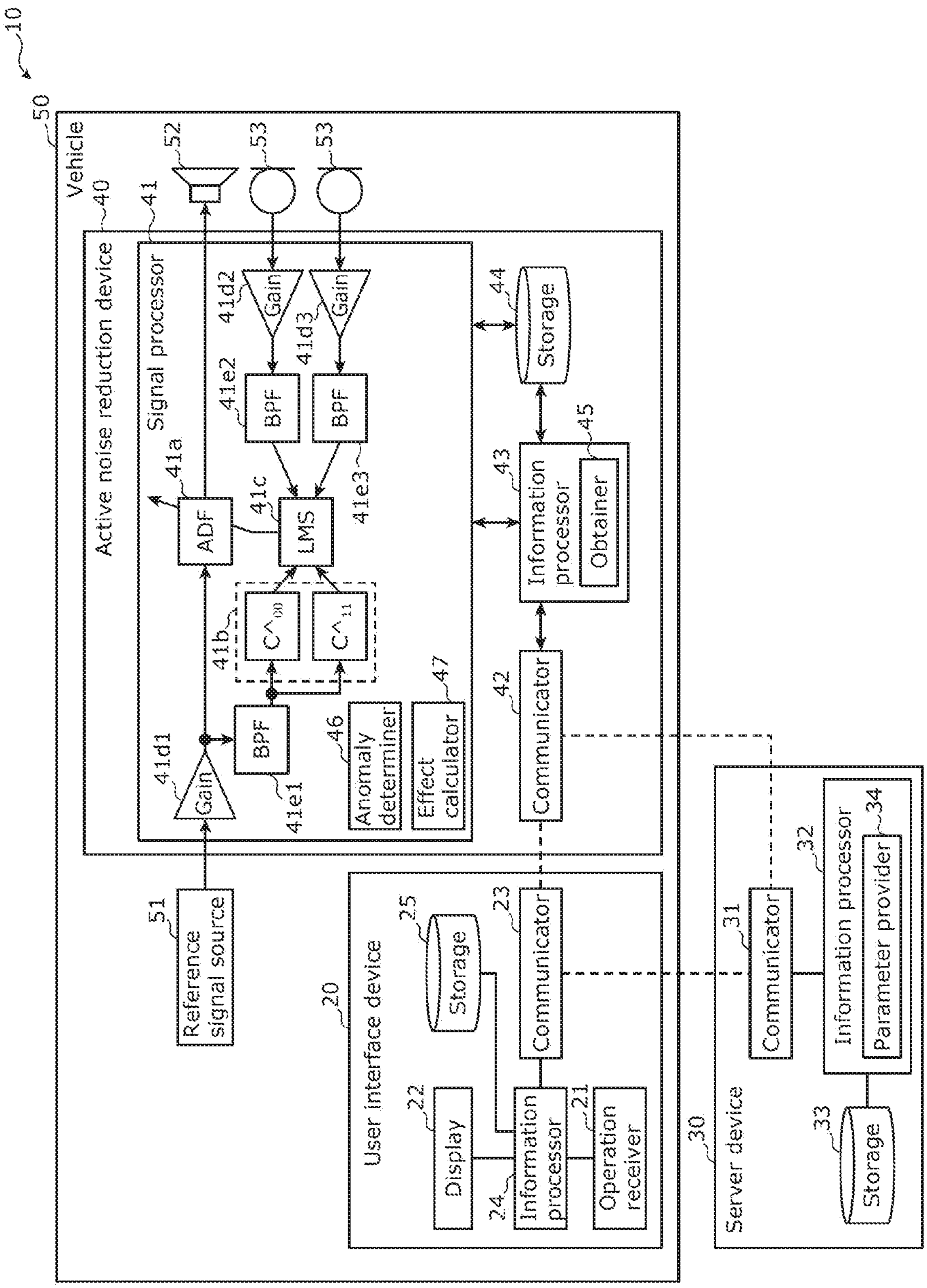
FIG. 1 illustrates a functional configuration of an active noise reduction system according to an embodiment.

Hereinafter, an embodiment will be specifically described with reference to the Drawings. It should be noted that the following embodiment shows a general or specific example. The numerical values, shapes, materials, constituent elements, the arrangement and connection of the constituent elements, steps, the processing order of the steps, etc. shown in the following embodiment are mere examples, and therefore do not limit the scope of the present disclosure. Among the constituent elements in the embodiment, constituent elements not recited in any one of the independent claims are described as arbitrary constituent elements.

Moreover, the respective drawings are schematic diagrams and are not necessarily precise illustrations. It should be noted that elements that are essentially the same share the same reference signs in the Drawings, and overlapping explanations thereof may be omitted or simplified.

Embodiment (Configuration)

Hereinafter, a configuration of an active noise reduction system according to an embodiment will be described. FIG. 1 illustrates a functional configuration of the active noise reduction system according to the embodiment.

Active noise reduction system 10 is a system for reducing noise in the interior (the in-vehicle space) of vehicle 50. Active noise reduction system 10 includes user interface device 20, server device 30, active noise reduction device 40, reference signal source 51, cancelling sound source 52, and error signal sources 53.

User interface device 20 is a device operated by a user for various settings of active noise reduction device 40. User interface device 20 is realized as, for example, a vehicle navigation device, a personal computer, a smartphone, or an information terminal such as a tablet device. For example, user interface device 20 is realized by installing a predetermined application program in a general information terminal. User interface device 20 includes operation receiver 21, display 22, communicator 23, information processor 24, and storage 25.

Operation receiver 21 receives an operation by a user. Specifically, operation receiver 21 is realized as a touch screen or the like.

Display 22 displays an image. Display 22 is realized as, for example, a display panel such as a liquid crystal display panel or an organic electroluminescent (EL) display panel.

Communicator 23 is a communication circuit (communication module) for user interface device 20 to communicate with server device 30 and active noise reduction device 40. For example, communicator 23 communicates with server device 30 via a wide-area communication network such as the Internet, and communicates with active noise reduction device 40 via a local communication network or a wide-area communication network. Communication performed by communicator 23 may be wireless communication or wired communication.

Information processor 24 performs information processing related to various settings of active noise reduction device 40 in response to a user's operation received by operation receiver 21. Information processor 24 is realized as, for example, a microcomputer, and may also be realized as a processor or a dedicated circuit. The function of information processor 24 is implemented by hardware, such as a microcomputer or a processor included in information processor 24, executing a computer program (software) stored in storage 25. The computer program includes the above-described predetermined application program.

Storage 25 is a storage device that stores the computer program or the like to be executed by information processor 24. Storage 25 is realized as, for example, a semiconductor memory or the like.

Server device 30 manages a parameter set related to noise reduction (generation of a cancelling sound to be described later) that is used in active noise reduction device 40. Server device 30 is a cloud server provided outside of vehicle 50. Server device 30 includes communicator 31, information processor 32, and storage 33.

Communicator 31 is a communication circuit (communication module) for server device 30 to communicate with user interface device 20 and active noise reduction device 40. For example, communicator 31 communicates with user interface device 20 and active noise reduction device 40 via a wide-area communication network. Communication performed by communicator 31 may be wireless communication or wired communication.

It should be noted that active noise reduction system 10 can also be realized as a system in which server device 30 and active noise reduction device 40 do not directly communicate with each other, and, in such a case, communicator 31 does not necessarily have a function to communicate with active noise reduction device 40.

Information processor 32 manages the parameter set related to noise reduction. Information processor 32 is realized as, for example, a microcomputer, and may also be realized as a processor or a dedicated circuit. The function of information processor 32 is implemented by hardware, such as a microcomputer or a processor included in information processor 32, executing a computer program (software) stored in storage 33.

Information processor 32 includes parameter provider 34 as a functional constituent element. A specific process performed by parameter provider 34 will be described later.

Storage 33 is a storage device that stores the computer program or the like to be executed by information processor 32. Storage 33 is realized as, for example, a hard disk drive (HDD), and may also be realized as a semiconductor memory.

Active noise reduction device 40 performs signal processing for reducing noise in the interior of vehicle 50. Active noise reduction device 40 includes signal processor 41, communicator 42, information processor 43, and storage 44.

Signal processor 41 performs signal processing on a reference signal obtained from reference signal source 51, to thereby generate a cancelling signal for outputting a cancelling sound from cancelling sound source 52. The cancelling sound is a sound for reducing noise in the interior of vehicle 50. The function of signal processor 41 is implemented by, for example, a microcomputer or a processor, such as a digital signal processor (DSP), executing a computer program (software) stored in storage 44.

Specifically, signal processor 41 includes adaptive filter unit 41*a*, simulated acoustic transmission characteristic filter unit 41*b*, filter coefficient updater 41*c*, gain adjusters 41*d*1 to 41*d*3, band pass filters (BPFs) 41*e*1 to 41*e*3, anomaly determiner 46, and effect calculator 47. Specific signal processing performed by signal processor 41 will be described later. It should be noted that anomaly determiner 46 and effect calculator 47 may be included in information processor 43, and effect calculator 47 may also be included in user interface device 20 or server device 30.

Communicator 42 is a communication circuit (communication module) for active noise reduction device 40 to communicate with user interface device 20 and server device 30. For example, communicator 42 communicates with user interface device 20 via a local communication network or a wide-area communication network, and communicates with server device 30 via a wide-area communication network. Communication performed by communicator 42 is, for example, wireless communication.

It should be noted that active noise reduction system 10 can also be realized as a system in which server device 30 and active noise reduction device 40 do not directly communicate with each other, and, in such a case, communicator 42 does not necessarily have a function to communicate with server device 30.

Information processor 43 performs information processing for causing signal processor 41 to reflect various settings instructed to user interface device 20 by a user, and the like. Information processor 43 is realized as, for example, a microcomputer, and may also be realized as a processor or a dedicated circuit. The function of information processor 43 is implemented by hardware, such as a microcomputer or a processor included in information processor 43, executing a computer program (software) stored in storage 44. The computer program includes the above-described predetermined application program.

Information processor 43 includes obtainer 45 as a functional constituent element. A specific process performed by obtainer 45 will be described later.

Storage 44 is a storage device that stores the computer program or the like to be executed by information processor

43. Storage 44 is realized as, for example, a hard disk drive (HDD), and may also be realized as a semiconductor memory.

Reference signal source 51 is a transducer that outputs a reference signal having a correlation with noise in the interior of vehicle 50. For example, reference signal source 51 is an acceleration sensor and is placed outside of the interior of vehicle 50. Specifically, reference signal source 51 is attached to a subframe or a wheel well. It should be noted that the attachment position of reference signal source 51 is not particularly limited. When reference signal source 51 is an acceleration sensor, active noise reduction device 40 can reduce a road-noise component included in noise in the interior of vehicle 50. Since a propagation path of road noise is complicated, a configuration in which a plurality of acceleration sensors are placed at a plurality of places is effective. It should be noted that reference signal source 51 may be a microphone.

Cancelling sound source 52 outputs a cancelling sound to the interior of vehicle 50 by using a cancelling signal. In the embodiment, cancelling sound source 52 is a loudspeaker. However, a cancelling sound may also be outputted by a driving mechanism, such as an actuator, vibrating a structure of part of vehicle 50 (e.g., a sunroof). Moreover, a plurality of cancelling sound sources 52 may be provided in vehicle 50. The attachment position of cancelling sound source 52 is not particularly limited.

Error signal source 53 detects a residual sound resulting from interference of a cancelling sound with noise in the interior of vehicle 50, and outputs an error signal based on the residual sound. Error signal source 53 is a transducer such as a microphone, and may be provided to a headliner or the like in the interior of vehicle 50. Although two error signal sources 53 are provided in vehicle 50 in the example in FIG. 1, it is sufficient that at least one error signal source 53 be provided in vehicle 50.

For example, error signal source 53 is provided to a seat in vehicle 50. When one of two error signal sources 53 is provided to a driver's seat and the other of the two error signal sources 53 is provided to a back seat, a noise reduction amount for a user sitting on the driver's seat and a noise reduction amount for a user sitting on the back seat can be individually adjusted.

(Basic Operation)

Figure 2:
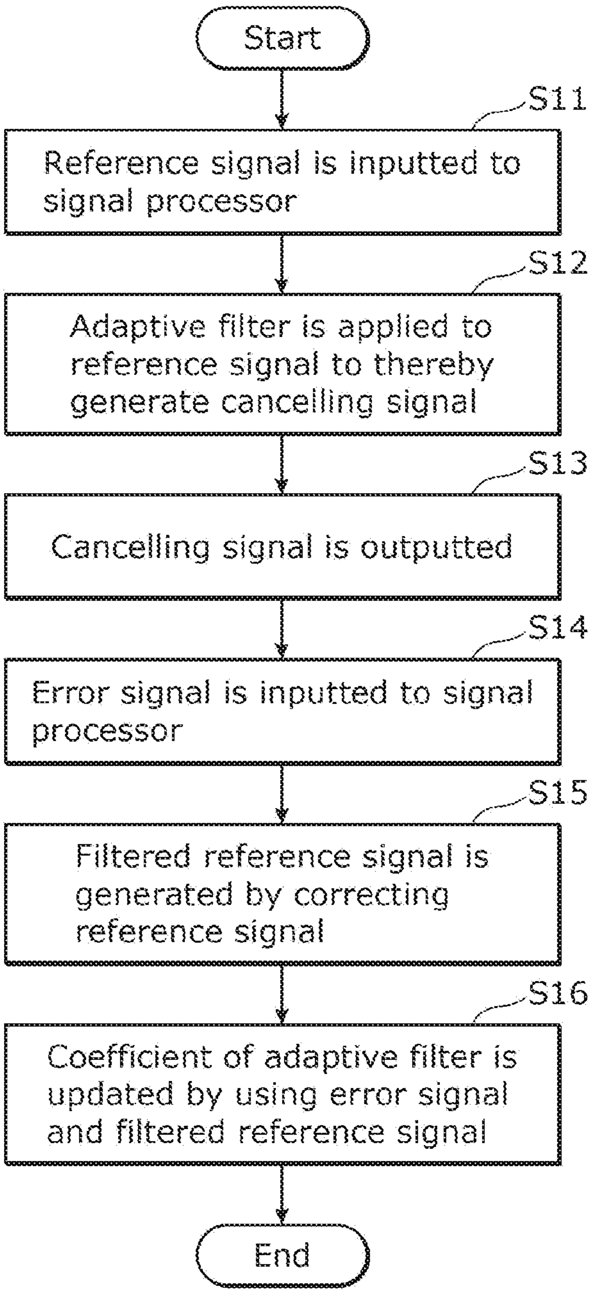
FIG. 2 is a flowchart of a basic operation of an active noise reduction device according to the embodiment.

As described above, active noise reduction device 40 performs a noise reduction operation. First, a basic operation of active noise reduction device 40 will be described with reference to FIG. 2. FIG. 2 is a flowchart of the basic operation of active noise reduction device 40. Hereinafter, a case where a single error signal source 53 is provided will be mainly described, and a case where a plurality of error signal sources 53 are provided will be supplementarily described.

First, a reference signal having a correlation with noise is inputted from reference signal source 51 to signal processor 41 of active noise reduction device 40 (S11).

The reference signal inputted to signal processor 41 is subjected to gain adjustment by gain adjuster 41*d*1, and then outputted to adaptive filter unit 41*a*. Moreover, the reference signal inputted to signal processor 41 is subjected to gain adjustment by gain adjuster 41*d*1, subjected to application of BPF 41*e*1, and then outputted to simulated acoustic transmission characteristic filter unit 41*b*.

Adaptive filter unit 41*a* applies an adaptive filter to the reference signal that has been subjected to the gain adjustment by gain adjuster 41*d*1 (i.e., performs a convolution), to thereby generate a cancelling signal (S12). Adaptive filter unit 41*a* is realized by a so-called FIR filter or IIR filter. Adaptive filter unit 41*a* outputs the cancelling signal generated to cancelling sound source 52 (S13). Cancelling sound source 52 outputs a cancelling sound based on the cancelling signal.

Error signal source 53 detects a residual sound resulting from interference of the cancelling sound outputted from cancelling sound source 52 with the noise, and outputs an error signal corresponding to the residual sound. In other words, the error signal is a signal indicating that the state of the noise in vehicle 50 when the cancelling sound is being outputted. Consequently, the error signal is inputted to signal processor 41 (S14).

The error signal inputted to signal processor 41 is subjected to gain adjustment by gain adjuster 41*d*2 (or gain adjuster 41*d*3), subjected to application of BPF 41*e*2 (or BPF 41*e*3), and then outputted to filter coefficient updater 41*c*.

Simulated acoustic transmission characteristic filter unit 41*b* generates a filtered reference signal by correcting the reference signal by using a simulated transmission characteristic simulating an acoustic transmission characteristic from the position of cancelling sound source 52 to the position of error signal source 53 (i.e., an acoustic transmission characteristic in a space) (S15). For example, the simulated transmission characteristic is actually measured in advance in the interior of vehicle 50, and then stored in storage 44. It should be noted that the simulated transmission characteristic may be determined by an algorithm that does not use a predetermined value.

Filter coefficient updater 41*c* appropriately updates coefficient W of the adaptive filter, based on the filtered reference signal generated and the error signal that has been subjected to the gain adjustment and the application of BPF (S16).

Specifically, filter coefficient updater 41*c* calculates, by using a least mean square (LMS) method, the coefficient of the adaptive filter so that the sum of squares of the error signal becomes minimum, and outputs, to adaptive filter unit 41*a*, the coefficient of the adaptive filter calculated. Moreover, filter coefficient updater 41*c* appropriately updates the coefficient of the adaptive filter. Coefficient W of an adaptive filter is represented by Formula 1 below, where e represents the vector of an error signal and R represents the vector of a filtered reference signal. It should be noted that n is a natural number and represents the n-th sample in a sampling period Ts. μ represents a scalar value and is a step-size parameter that determines an update amount of coefficient W of an adaptive filter per sampling.

[Math. 1]

$$W(n+1)+=W(n)-\mu e(n)R(n) \quad \text{(Formula 1)}$$

It should be noted that, when two error signal sources 53 are provided in vehicle 50, coefficient $W_{00}$ of an adaptive filter is represented by Formula 2 below, where $R_{000}$ and $R_{001}$ represent the vectors of two filtered reference signals corresponding to the two error signal sources 53, $e'_0$ and $e''_1$ represent the vectors of two error signals, and $p_{000}$ and pool represent two step-size parameters. It should be noted that, when considering leak coefficient α, coefficient $W_{00}$ of an adaptive filter is represented by Formula 3 below.

[Math. 2]

$$W_{00}(n+1)=W_{00}(n)-\mu_{000}\acute{e}_0(n)R_{000}(n)-\mu_{001}\acute{e}_1(n)R_{001}(n) \quad \text{(Formula 2)}$$

$$W_{00}(n+1)=\alpha W_{00}(n)-\mu_{000}\acute{e}_0(n)R_{000}(n)-\mu_{001}\acute{e}_1(n)R_{001}(n) \quad \text{(Formula 3)}$$

As described above, signal processor 41 of active noise reduction device 40 can generate a cancelling signal by applying an adaptive filter, of which coefficient is updated based on an error signal, to a reference signal.

(Operation for Changing a Parameter Set)

Signal processor 41 generates a cancelling signal based on the default parameter set predetermined by a designer or the like. Here, the parameter set is a parameter set for performing adjustment related to a cancelling sound in a state where the cancelling sound is being outputted to the interior of vehicle 50 (cancelling sound ON state).

The parameter set includes a gain coefficient by which a reference signal is multiplied in gain adjuster 41*d*1, a gain coefficient by which an error signal is multiplied in gain adjuster 41*d*2, a gain coefficient by which an error signal is multiplied in gain adjuster 41*d*3, and step-size parameter μ. As described above, for example, when each of the two error signal sources 53 is provided to a different one of seats in vehicle 50, a noise reduction amount can be individually set for each of the seats provided with the two error signal sources 53, by individually adjusting the gain coefficient by which an error signal is multiplied in gain adjuster 41*d*2 and the gain coefficient by which an error signal is multiplied in gain adjuster 41*d*3.

Moreover, the parameter set includes characteristics (e.g., passbands and the like) of BPFs 41*e*1 to 41*e*3. The passbands of BPFs 41*e*1 to 41*e*3 correspond to a frequency band (also referred to as a control frequency band) that is a target of noise reduction. The characteristics of BPFs 41*e*1 to 41*e*3 are basically set to be the same among BPFs 41*e*1 to 41*e*3, and may also be set to be different among BPFs 41*e*1 to 41*e*3.

Although it is considered that many general users would like to tune the performance of vehicle 50 according to their own preference, things related to driving safety of vehicle 50 cannot be easily tuned. However, it is considered that the above-described parameter set related to noise reduction in the interior of vehicle 50 can be tuned by a user because the above-described parameter set is not directly related to driving safety.

Figure 3:
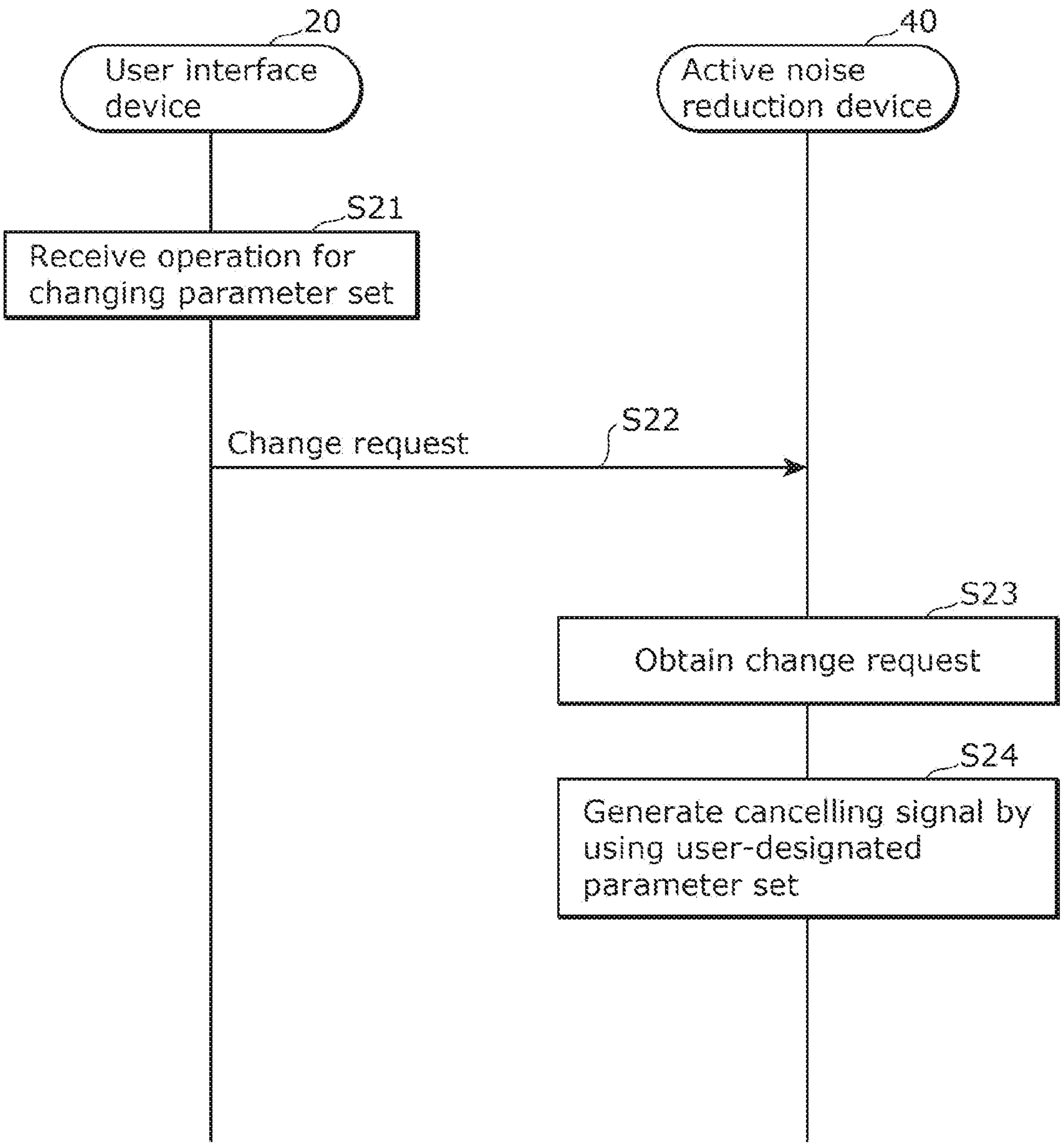
FIG. 3 is a sequence diagram of an operation for changing a parameter set.

Accordingly, in active noise reduction system 10, the above-described default parameter set can be changed by a general user (an end user who actually uses vehicle 50) different from the designer or the like. In other words, active noise reduction device (signal processor 41) can change the default parameter set to a user-designated parameter set to generate a cancelling signal. Hereinafter, an operation for changing such a parameter set will be described. FIG. 3 is a sequence diagram of an operation for changing a parameter set.

First, a user performs an operation for changing a parameter set on operation receiver 21 of user interface device 20, and operation receiver 21 receives the operation (S21). When the operation for changing a parameter set is received by operation receiver 21, information processor 24 transmits, to active noise reduction device 40, a change request for changing the above-described parameter set to a user-designated parameter set by using communicator 23 (S22).

Communicator 42 of active noise reduction device 40 receives the change request. Obtainer 45 obtains the change request (S23), and causes signal processor 41 to reflect the user-designated parameter set included in the change request obtained. Signal processor 41 generates a cancelling signal by using the user-designated parameter set based on the change request obtained (S24).

Thus, active noise reduction device 40 can change the default parameter set to the user-designated parameter set to generate a cancelling signal. It should be noted that a user does not necessarily change all of the parameters included in the parameter set, and it is sufficient that a user can change at least one of the parameters included in the parameter set.

(Operation for Anomaly Notification)

Figure 4:
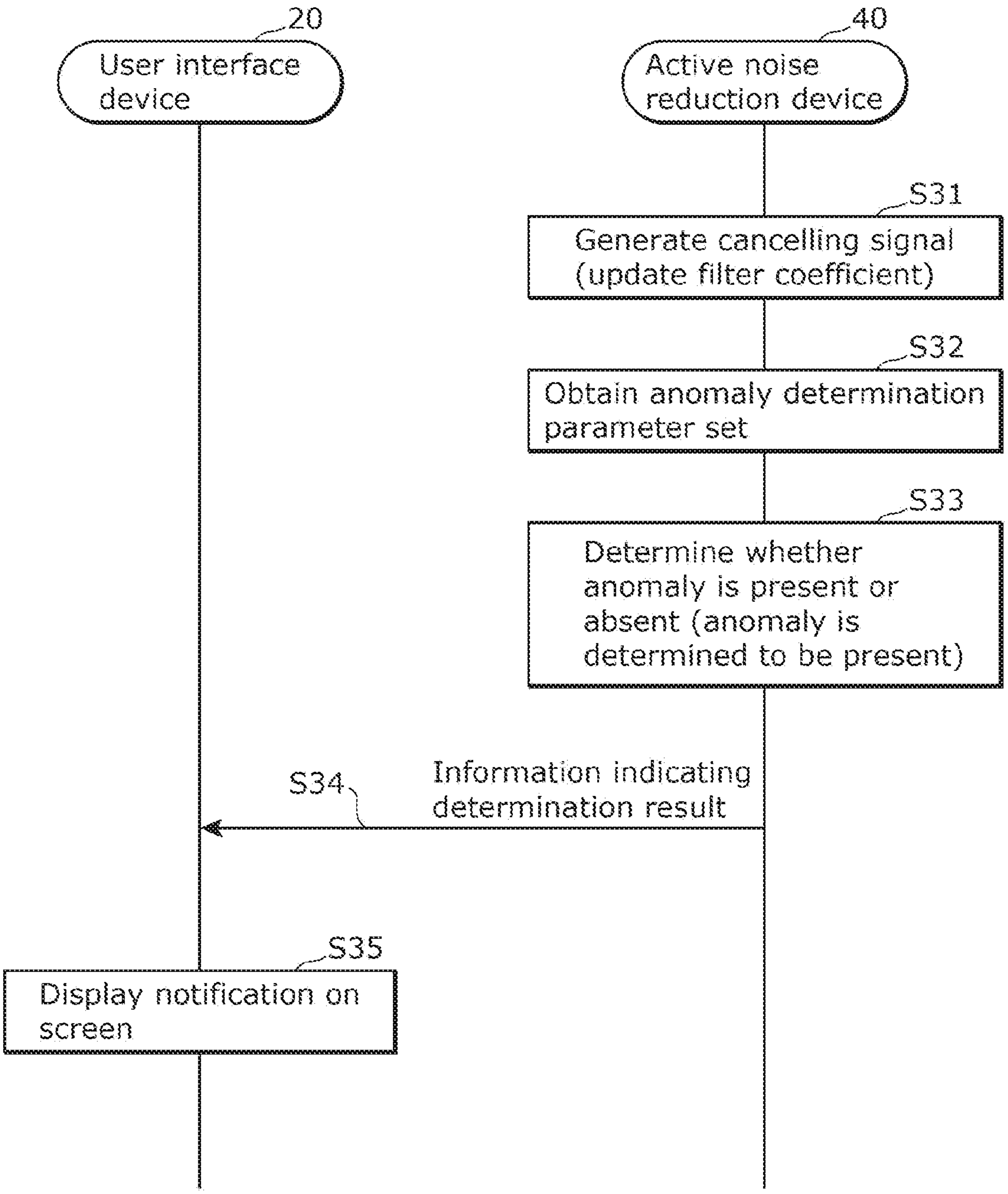
FIG. 4 is a sequence diagram of an operation for anomaly notification.

Active noise reduction device 40 can determine a state in which there is a possibility that noise cannot be appropriately reduced by a cancelling sound (a state in which a cancelling sound itself becomes an anomalous sound) as a state in which an anomaly is present in noise control, and notify a user of the anomaly. FIG. 4 is a sequence diagram of an operation for such anomaly notification.

When signal processor 41 of active noise reduction device 40 generates a cancelling signal according to the basic operation, that is, when filter coefficient updater 41*c* updates coefficient W of an adaptive filter (S31), anomaly determiner 46 obtains an anomaly determination parameter set related to adaptive filter unit 41*a* (S32). Anomaly determiner 46 determines whether an anomaly is present or absent based on the anomaly determination parameter set obtained (S33).

The anomaly determination parameter set is, for example, coefficient W of an adaptive filter, and may also be absolute value |ΔW| of an update amount of coefficient W of an adaptive filter. Specifically, |ΔW| is calculated by the second term and the subsequent terms on the right side. Moreover, the anomaly determination parameter set may be the amplitude (signal level) of a cancelling signal outputted by adaptive filter unit 41*a*. Moreover, anomaly determiner 46 may use, as the anomaly determination parameter set, two or more of coefficient W of an adaptive filter, update amount ΔW of coefficient W of an adaptive filter, or the amplitude of a cancelling signal. In other words, it is sufficient that the anomaly determination parameter set includes at least one of coefficient W of an adaptive filter, update amount ΔW of coefficient W of an adaptive filter, or the amplitude of a cancelling signal.

It is considered that the value of the anomaly determination parameter set becomes greater as noise control becomes more unstable. Therefore, for example, anomaly determiner 46 determines that an anomaly is present in noise control when the value of the anomaly determination parameter set remains above a threshold value for a certain period of time or more, and determines that an anomaly is absent in noise control in any case other than the above case. The certain period of time and the threshold value in this case are appropriately determined in an empirical manner or in an experimental manner. Moreover, anomaly determiner 46 may determine that an anomaly is present in noise control when the value of the anomaly determination parameter set exceeds a threshold value a predetermined number of times or more during a certain period of time, and determine that an anomaly is absent in noise control in any case other than the above case. The certain period of time, the threshold value, and the predetermined number of times in this case are appropriately determined in an empirical manner or in an experimental manner.

A method using the number of taps of an adaptive filter may be employed as another method for determining whether an anomaly is present or absent. A convolution operation can be represented by $x[0]\cdot W[i]+x[1]\cdot W[i-1]+x[2]\cdot W[i-2]+\alpha \ldots +x[L-1]\cdot W[i-(L-1)]$, where x[n] represents the n-th sample of a reference signal, W[n] represents the n-th coefficient of an adaptive filter, and L represents the number of taps. Anomaly determiner 46 may determine that an anomaly is present when the sum of the largest n of L terms in the convolution operation is greater than or equal to a threshold value, and may determine that an anomaly is absent when the sum of the largest n of L terms in the convolution operation is less than a threshold value. Moreover, anomaly determiner 46 may determine that an anomaly is present when, among L terms in the convolution operation, the number of terms each of which has a value out of a predetermined range is a predetermined number or more, and may determine that an anomaly is absent when, among L terms in the convolution operation, the number of terms each of which has a value out of the predetermined range is less than the predetermined number.

When determining that an anomaly is present in noise control, anomaly determiner 46 outputs (transmits) information indicating a determination result to user interface device 20 via information processor 43 and communicator 42 (S34).

Figure 5:
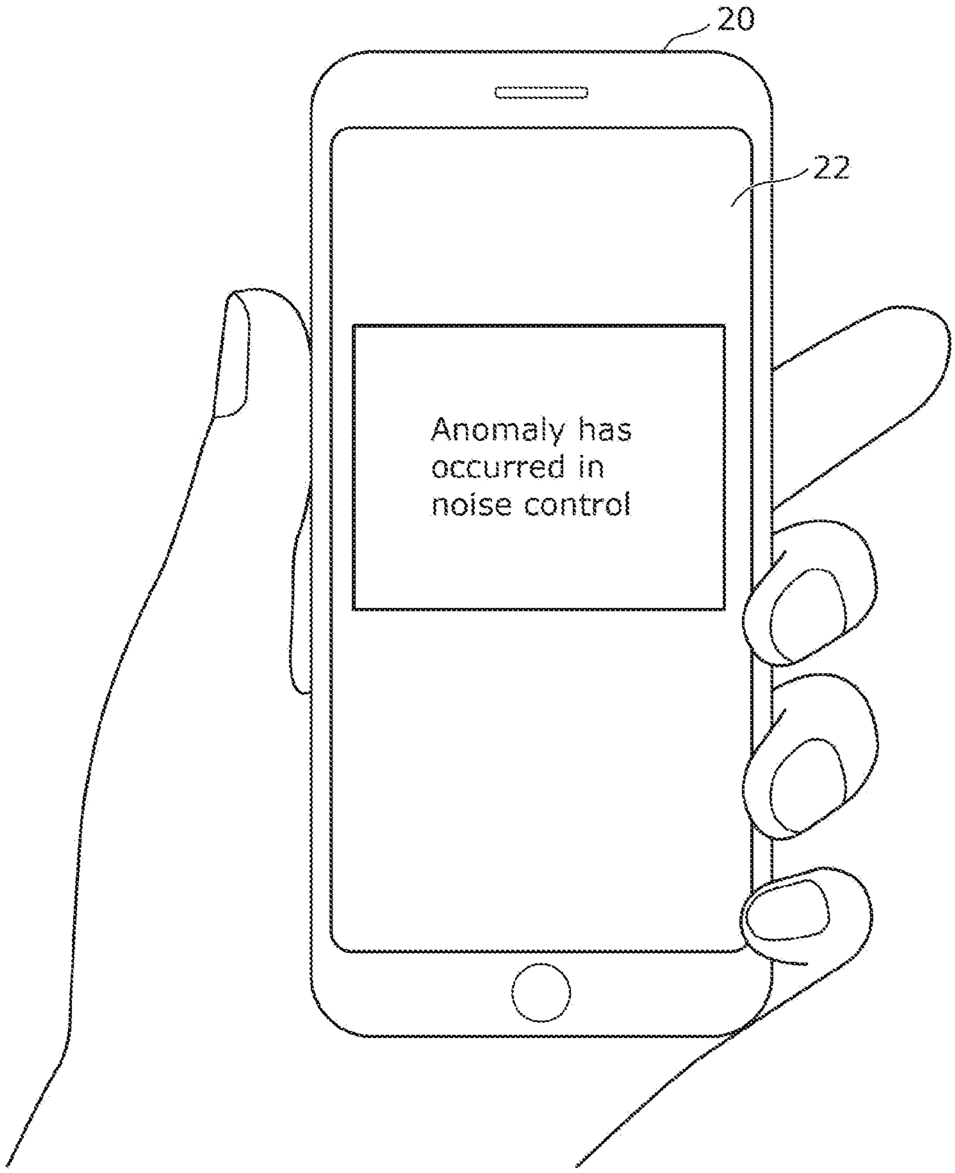
FIG. 5 illustrates an example of an anomaly notification on a screen.

Communicator 23 of user interface device 20 receives the information indicating the determination result. Information processor 24 displays a notification, such as a notification as shown in FIG. 5, on a screen of display 22, based on the information indicating the determination result received by communicator 23 (S35). FIG. 5 illustrates an example of an anomaly notification on a screen.

Although not illustrated in FIG. 4, when determining that an anomaly is absent in noise control, anomaly determiner 46 does not output information indicating a determination result. It should be noted that, even when determining that an anomaly is absent in noise control, anomaly determiner 46 may output (transmit) information indicating a determination result to user interface device 20.

As described above, active noise reduction system 10 includes anomaly determiner 46 that determines whether an anomaly is present or absent based on at least one of coefficient W of an adaptive filter, an update amount of coefficient W of an adaptive filter, or the signal level of a cancelling signal. Anomaly determiner 46 outputs information indicating a determination result to user interface device 20 when anomaly determiner 46 determines that an anomaly is present.

Thus, active noise reduction system 10 can notify a user of an occurrence of an anomaly in noise control. When active noise reduction device 40 generates a cancelling sound by using a user-designated parameter set, an anomaly may be likely to occur in noise control. However, with the function of anomaly determiner 46, an effect of causing a user to easily notice an occurrence of an anomaly in noise control can be obtained.

Figure 6:
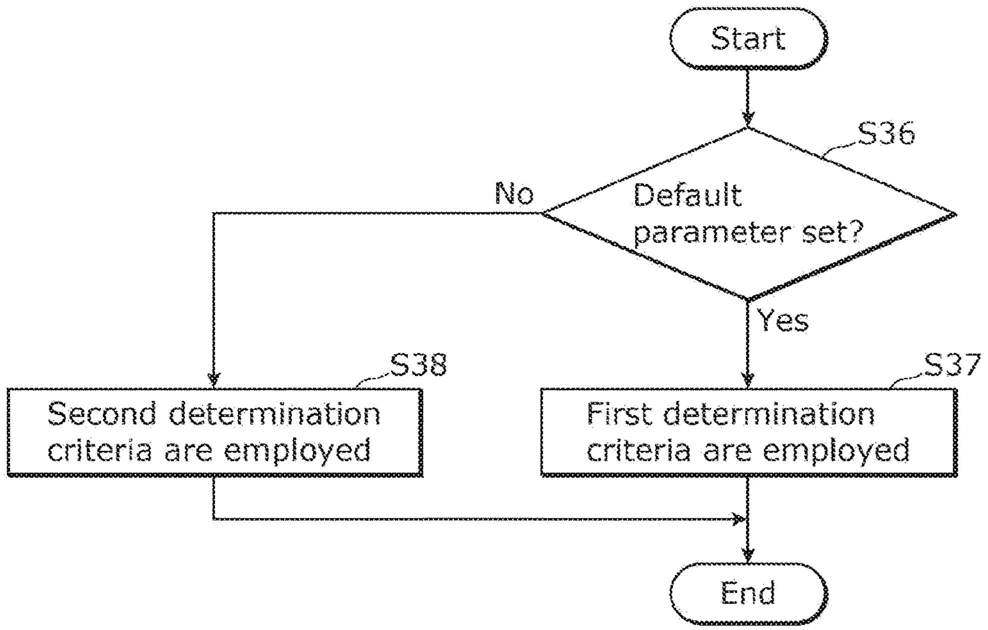
FIG. 6 is a flowchart of an operation for changing determination criteria.

It should be noted that, in step S33, determination criteria (such as a certain period of time, a threshold value, and a predetermined number of times, as described above) for determining whether an anomaly is present or absent in noise control may be changed according to whether the noise control is performed based on the default parameter set or a user-designated parameter set. FIG. 6 is a flowchart of an operation for changing determination criteria.

Anomaly determiner 46 determines whether noise control is performed based on the default parameter set (S36). It is possible to determine whether noise control is performed based on the default parameter set, by referring to, for example, information (such as a flag) indicating the settings of a parameter set stored in storage 44. When determining that the noise control is performed based on the default parameter set (S36: Yes), anomaly determiner 46 employs first determination criteria (S37). On the other hand, when determining that the noise control is performed based not on the default parameter set but on a user-designated parameter set (S36: No), anomaly determiner 46 employs second determination criteria by which an anomaly is more likely to be determined to be present than the first determination criteria (S38).

For example, when the first determination criteria require that the value of an anomaly determination parameter set remains above a threshold value for a certain period of time or more, the threshold value is set to a smaller value in the second determination criteria than that in the first determination criteria, or the certain period of time is set to a shorter period of time in the second determination criteria than that in the first determination criteria. Moreover, when the first determination criteria require that the value of an anomaly determination parameter set exceeds a threshold value a predetermined number of times or more during a certain period of time, the threshold value is set to a smaller value in the second determination criteria than that in the first determination criteria, the predetermined number of times is set to a smaller number of times in the second determination criteria than that in the first determination criteria, or the certain period of time is set to a longer period of time in the second determination criteria than that in the first determination criteria.

Thus, anomaly determiner 46 changes determination criteria for determining whether an anomaly is present or absent to increase a likelihood of determining that an anomaly is present when a cancelling signal is generated by using a user-designated parameter set than when a cancelling signal is generated by using the default parameter set. Accordingly, active noise reduction system 10 can prevent an occurrence of an anomalous sound in an early stage (with sufficient time) even when an inappropriate user-designated parameter set is used.

Conversely, anomaly determiner 46 may change determination criteria for determining whether an anomaly is present or absent to decrease a likelihood of determining that an anomaly is present when a cancelling signal is generated by using a user-designated parameter set. Thus, notification of an occurrence of an anomaly is less likely to be performed, and an effect of causing a user to easily notice, by sensation (not by a notification), an occurrence of an anomaly caused by a user-designated parameter set can be obtained.

It should be noted that at least one of the first determination criteria or the second determination criteria (i.e., determination criteria for determining whether an anomaly is present or absent) may be set based on an operation performed, by a user, on user interface device 20.

(Fail-Safe Operation)

Figure 7:
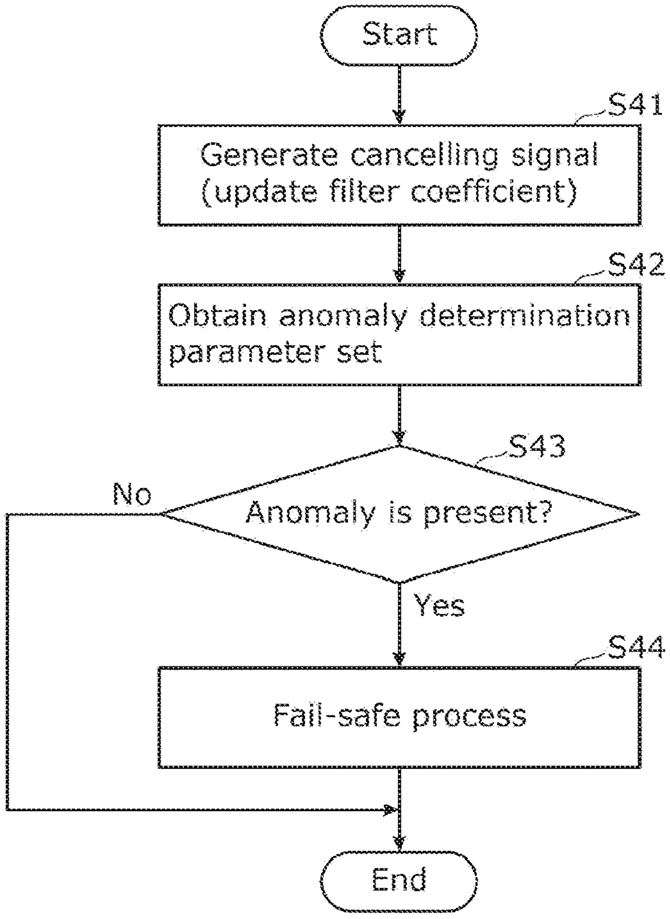
FIG. 7 is a flowchart of a fail-safe operation.

Active noise reduction device 40 may perform a fail-safe process instead of or in addition to notification of an occurrence of an anomaly in noise control. FIG. 7 is a flowchart of a fail-safe operation (operation of performing a fail-safe process when an anomaly is determined to be present in noise control).

When signal processor 41 of active noise reduction device 40 generates a cancelling signal according to the basic operation, that is, when filter coefficient updater 41$c$ updates coefficient W of an adaptive filter (S41), anomaly determiner 46 obtains an anomaly determination parameter set related to adaptive filter unit 41$a$ (S42). Anomaly determiner 46 determines whether an anomaly is present or absent based on the anomaly determination parameter set obtained (S43). Detailed description of processes in step S41 to step S43 is omitted since the processes in step S41 to step S43 are the same as the processes in step S31 to step S33 in the operation for anomaly notification (FIG. 4).

When determining that an anomaly is present in noise control (S43: Yes), anomaly determiner 46 performs a fail-safe process (S44). Anomaly determiner 46 performs, as the fail-safe process, a process for stopping output of a cancelling sound. For example, anomaly determiner 46 stops output of a cancelling sound by fixing coefficient W of an adaptive filter to 0 (i.e., by setting the amplitude of the cancelling signal to 0).

Moreover, anomaly determiner 46 may perform, as the fail-safe process, a process for resetting coefficient W of an adaptive filter to an initial value (0 or a predetermined value). Anomaly determiner 46 may perform, as the fail-safe process, a process for decreasing a leak coefficient or a process for decreasing a step-size parameter.

Alternatively, when determining that an anomaly is absent in noise control (S43: No), anomaly determiner 46 does not perform the fail-safe process. In this case, normal noise control (update of filter coefficient W) is continued.

Thus, when determining that an anomaly is present in noise control, anomaly determiner 46 performs the fail-safe process, and the fail-safe process includes at least one of the process for stopping output of a cancelling sound or the process for resetting coefficient W of an adaptive filter.

Accordingly, active noise reduction system 10 can prevent a cancelling sound from becoming an anomalous sound when noise control is performed.

Figure 8:
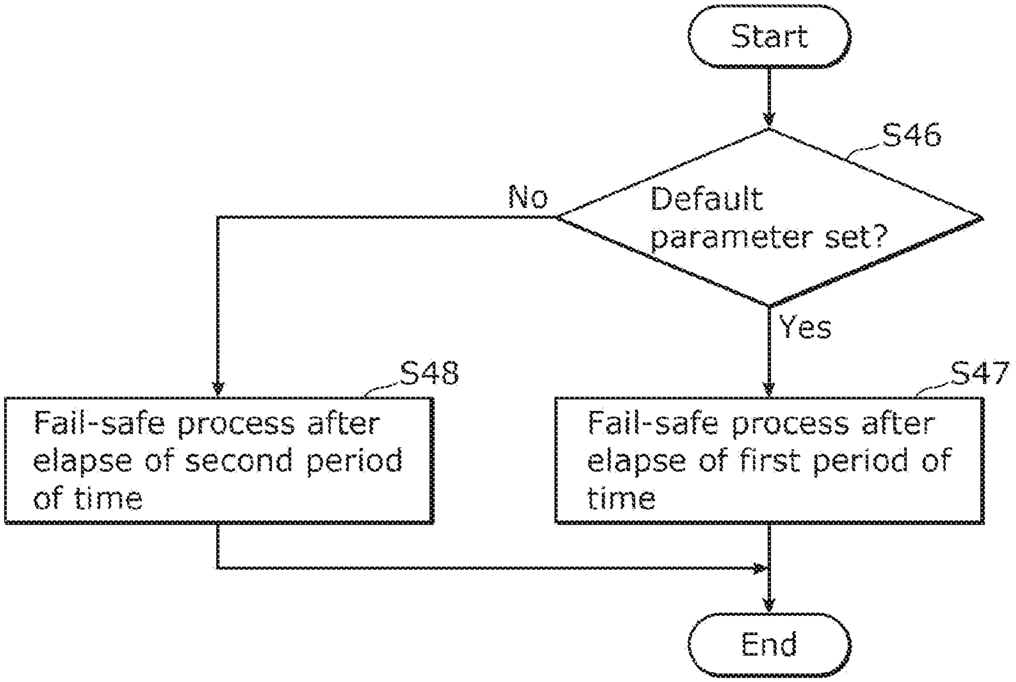
FIG. 8 is a flowchart of an operation for changing a timing of performing the fail-safe process.

It should be noted that, in step S43, a time period from a timing at which an anomaly is determined to be present in noise control to a timing at which the fail-safe process is performed in step S44 may be changed according to whether the noise control is performed based on the default parameter set or on a user-designated parameter set. FIG. 8 is a flowchart of an operation for changing a timing of performing a fail-safe process.

Anomaly determiner 46 determines whether noise control is performed based on the default parameter set (S46). It is possible to determine whether noise control is performed based on the default parameter set, by referring to, for example, information (such as a flag) indicating settings of the parameter set stored in storage 44. When determining that the noise control is performed based on the default parameter set (S46: Yes), anomaly determiner 46 performs the fail-safe process after elapse of a first period of time from when an anomaly is determined to be present (S47). Alternatively, when determining that the noise control is performed based not on the default parameter set but on a user-designated parameter set (S46: No), anomaly determiner 46 performs the fail-safe process after elapse of a second period of time from when an anomaly is determined to be present (S48). The second period of time is longer than the first period of time, for example.

Thus, anomaly determiner 46 extends a period of time from when an anomaly is determined to be present to when the fail-safe process is performed longer when a cancelling signal is generated by using a user-designated parameter set than when a cancelling signal is generated by using the default parameter set. Accordingly, an effect of causing a user to easily notice an occurrence of an anomaly caused by a user-designated parameter set can be obtained by slightly destabilizing noise control on purpose.

It should be noted that at least one of the first period of time or the second period of time (i.e., a period of time from when an anomaly is determined to be present to when the fail-safe process is performed) may be set based on an operation performed, by a user, on user interface device 20.

(Operation for Calculating a Noise Reduction Effect)

Figure 9:
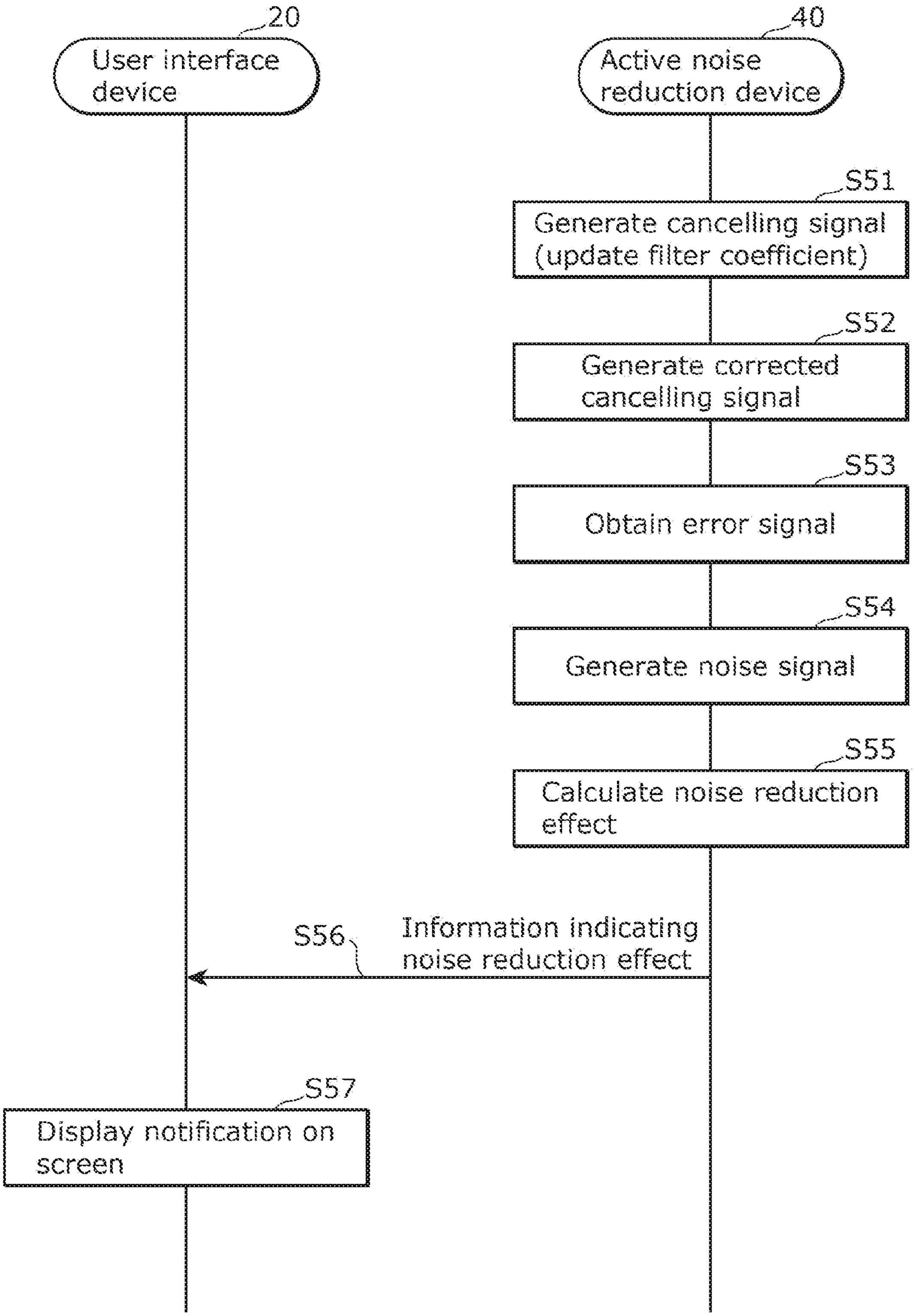
FIG. 9 is a sequence diagram of an operation for noise reduction effect notification.

Active noise reduction device 40 can calculate how much noise is reduced by a cancelling sound (hereinafter, also referred to as a noise reduction effect) and notify a user of a calculation result. FIG. 9 is a sequence diagram of an operation for such noise reduction effect notification.

When signal processor 41 of active noise reduction device 40 generates a cancelling signal according to the basic operation, that is, when filter coefficient updater 41*c* updates coefficient W of an adaptive filter (S51), effect calculator 47 multiplies the cancelling signal by a simulated transfer function to thereby generate a corrected cancelling signal (S52). The corrected cancelling signal can be said to be a signal indicating the state of a cancelling sound at the position of error signal source 53.

Next, effect calculator 47 obtains an error signal outputted by error signal source 53 (S53). The error signal can be said to be a signal indicating a state where noise is combined with the cancelling sound at the position of error signal source 53.

Next, effect calculator 47 subtracts the corrected cancelling signal from the error signal to thereby generate a noise signal (S54). The noise signal can be said to be a signal indicating the state of the noise at the position of error signal source 53 (when assuming that the cancelling sound is not outputted).

Next, effect calculator 47 calculates a noise reduction effect based on a difference between the noise signal generated at step S54 and the error signal obtained at step S53 (S55). It is considered that a bigger difference between the noise signal and the error signal results in a higher noise reduction effect. Therefore, effect calculator 47 can determine the score of the noise reduction effect according to the difference.

Next, effect calculator 47 outputs (transmits) information indicating the noise reduction effect (score) calculated to user interface device 20 via information processor 43 and communicator 42 (S56).

Figure 10:
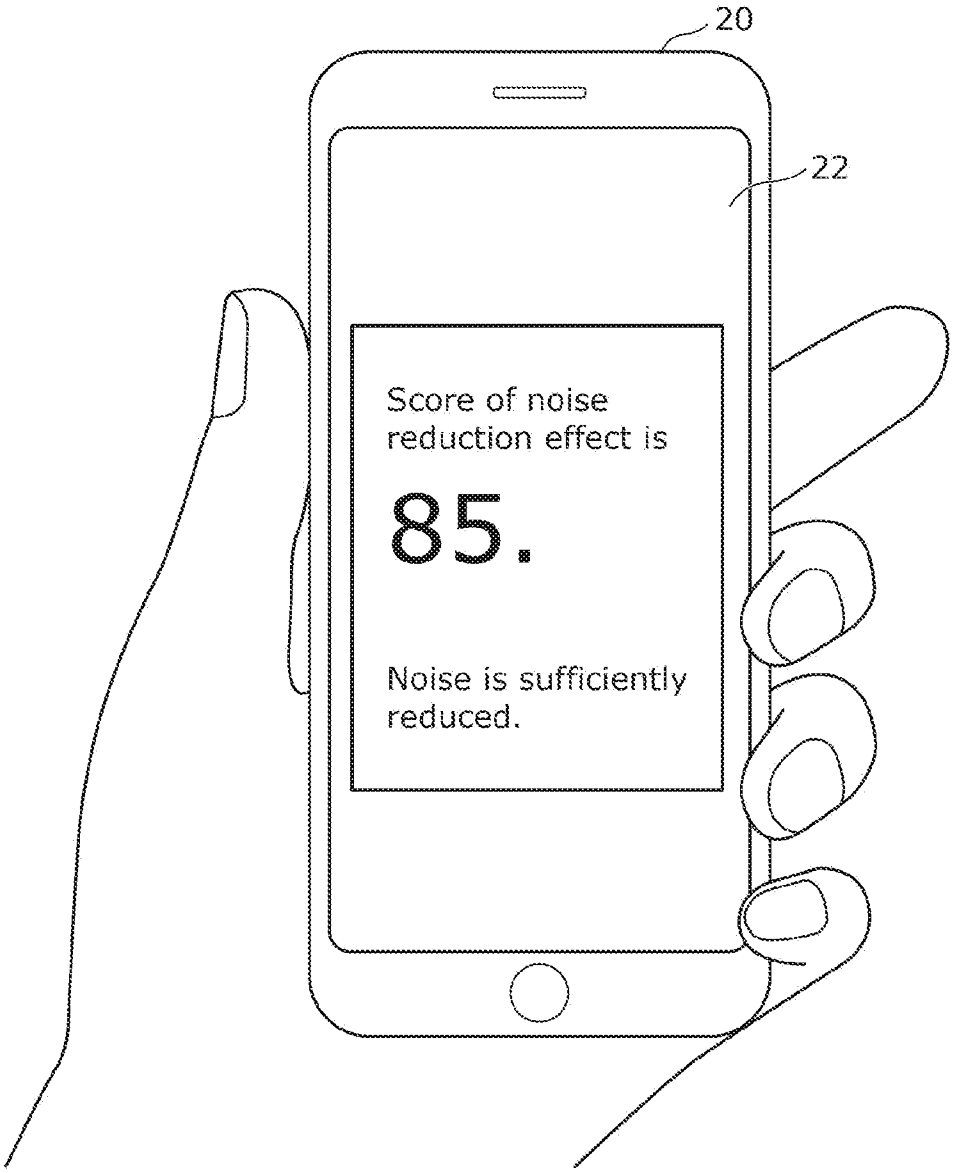
FIG. 10 illustrates an example of a noise reduction effect notification on a screen.

Communicator 23 of user interface device 20 receives the information indicating the noise reduction effect. Information processor 24 displays a notification, such as a notification as shown in FIG. 10, on a screen of display 22, based on the information indicating the noise reduction effect received by communicator 23 (S57). FIG. 10 illustrates an example of a notification on a screen. It should be noted that, a specific noise reduction amount as the noise reduction effect may be represented by a decibel (dB) in the notification on the screen.

As described above, active noise reduction system 10 includes effect calculator 47 that calculates a noise reduction effect of a cancelling sound, and effect calculator 47 outputs, to user interface device 20, information indicating the noise reduction effect calculated.

Accordingly, active noise reduction system 10 can notify a user of how much noise reduction effect is obtained. When active noise reduction device 40 generates a cancelling sound by using a user-designated parameter set, it may be difficult to perceive whether a noise reduction effect is obtained. However, with the function of effect calculator 47, it is possible to support a user to perceive a noise reduction effect.

(Operation for Uploading a User-Designated Parameter Set)

Figure 11:
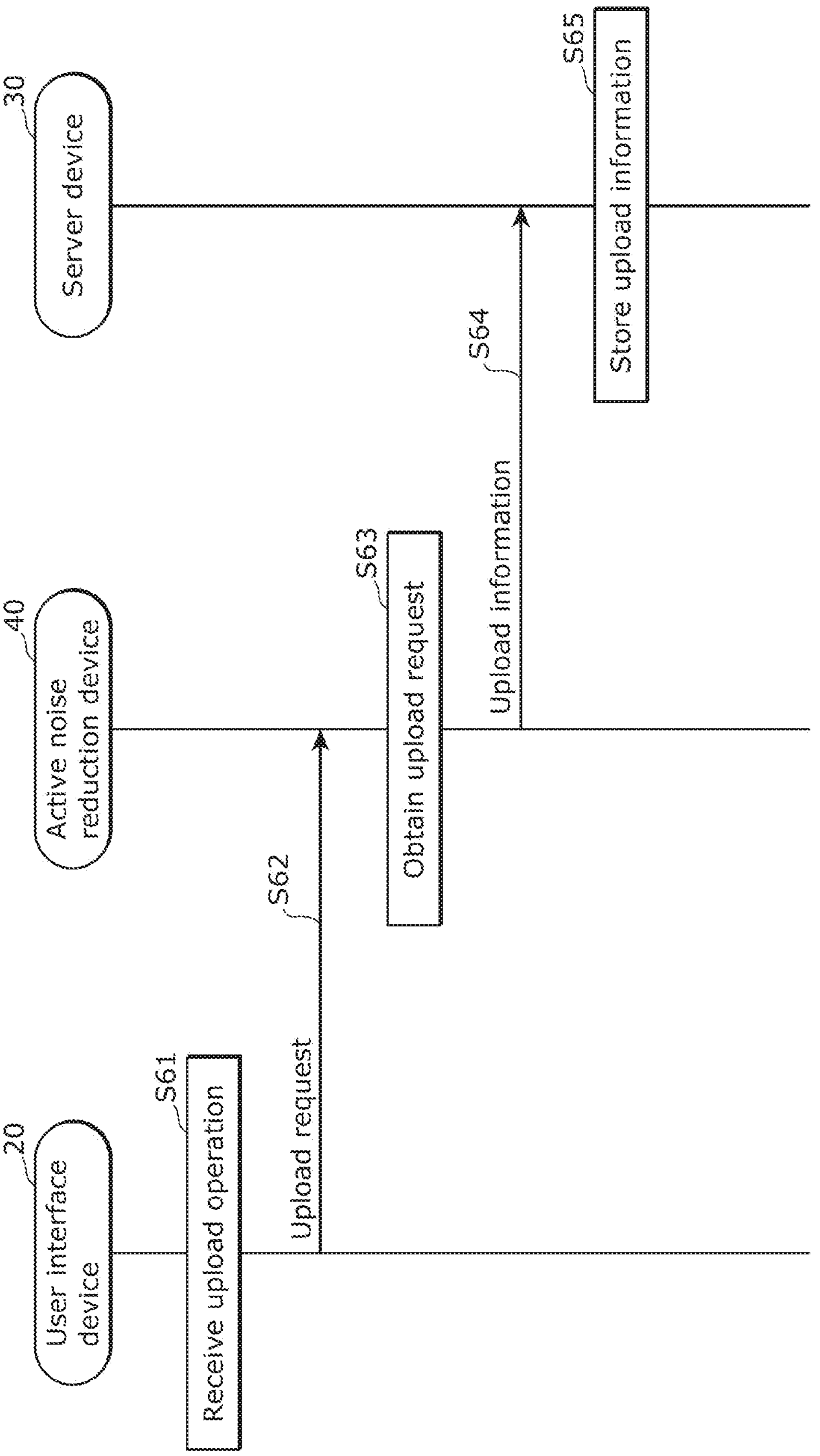
FIG. 11 is a sequence diagram of an operation for uploading a user-designated parameter set.

A user can upload a user-designated parameter set to server device 30. FIG. 11 is a sequence diagram of an operation for uploading a user-designated parameter set.

First, a user performs an operation for uploading a user-designated parameter set (hereinafter, also referred to as an upload operation) on operation receiver 21 of user interface device 20, and operation receiver 21 receives the upload operation (S61). When the upload operation is received by operation receiver 21, information processor 24 transmits, to active noise reduction device 40, an upload request for uploading the user-designated parameter set by using communicator 23 (S62).

Communicator 42 of active noise reduction device 40 receives the upload request. Obtainer 45 obtains the upload request (S63), and information processor 43 transmits, based on the upload request received, upload information including the user-designated parameter set to server device 30 by using communicator 42 (S64). At this time, information processor 43 can cause the upload information to include user identification information (user name), a noise reduction effect to be obtained by the user-designated parameter set, the stability of noise control to be obtained by the user-designated parameter set, or the like, in addition to the user-designated parameter set. It should be noted that the noise reduction effect is calculated by effect calculator 47. For example, the stability of noise control is determined based on how often anomaly determiner 46 determines that an anomaly is present, or the like.

Communicator 31 of server device 30 receives the upload information. Information processor 32 stores, in storage 33, the upload information received by communicator 31 (S65).

Thus, the user can upload the user-designated parameter set to server device 30. Although not shown in the Drawings, an other user can upload, to server device 30, a user-designated parameter set created by the other user.

For example, a manufacturer and a seller of active noise reduction device 40, a manufacturer and a seller of vehicle 50 in which active noise reduction device 40 is installed, and the like can collect user-designated parameter sets from many users by managing server device 30 (or contracting out the management of server device 30 to a server management service provider), and can acquire know-how by analyzing the user-designated parameter sets collected. Accordingly, a manufacturer and a seller of active noise reduction device 40 and a manufacturer and a seller of vehicle 50, and the like can develop active noise reduction device 40 by which further precise noise control is made possible.

It should be noted that, although upload information is transmitted from active noise reduction device 40 to server device 30 in the example in FIG. 11, a communication path for transmitting upload information is not particularly limited to this example. For example, user interface device 20 may receive a user-designated parameter set from active noise reduction device 40 and transmit the user-designated parameter set received to server device 30. When upload information (a user-designated parameter set) is stored in advance in user interface device 20, communication between user interface device 20 and active noise reduction device 40 can be omitted and the upload information can be transmitted from user interface device 20 to server device 30.

(Operation for Downloading a User-Designated Parameter Set)

Figure 12:
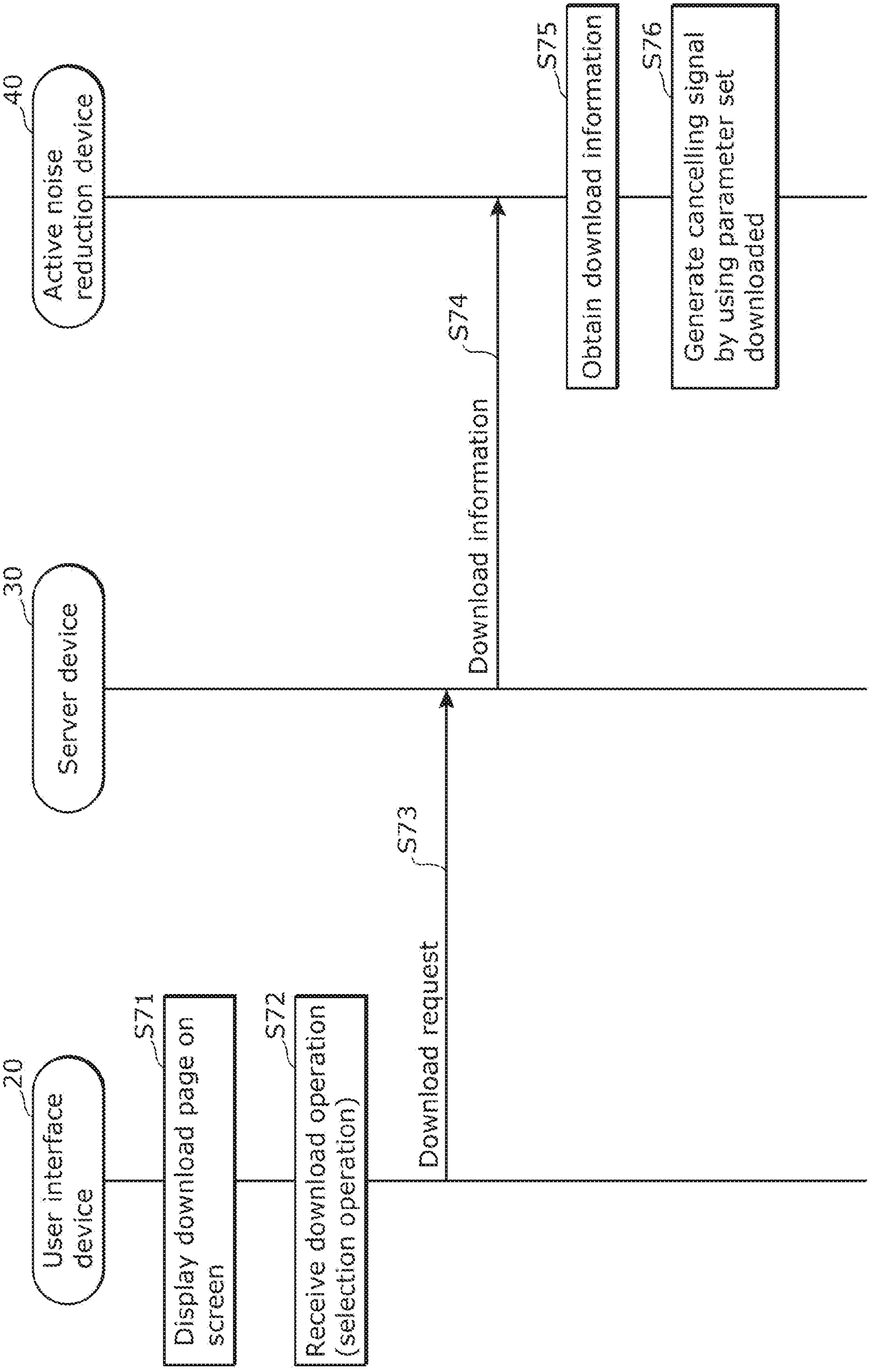
FIG. 12 is a sequence diagram of an operation for downloading a user-designated parameter set.

According to the operation for uploading a user-designated parameter set as described above, a user and a plurality of users other than the user can upload user-designated parameter sets to server device 30. Then, the user can download and use, from server device 30, a user-designated parameter set created by one of the plurality of users other than the user. FIG. 12 is a sequence diagram of an operation for downloading a user-designated parameter set.

Figure 13:
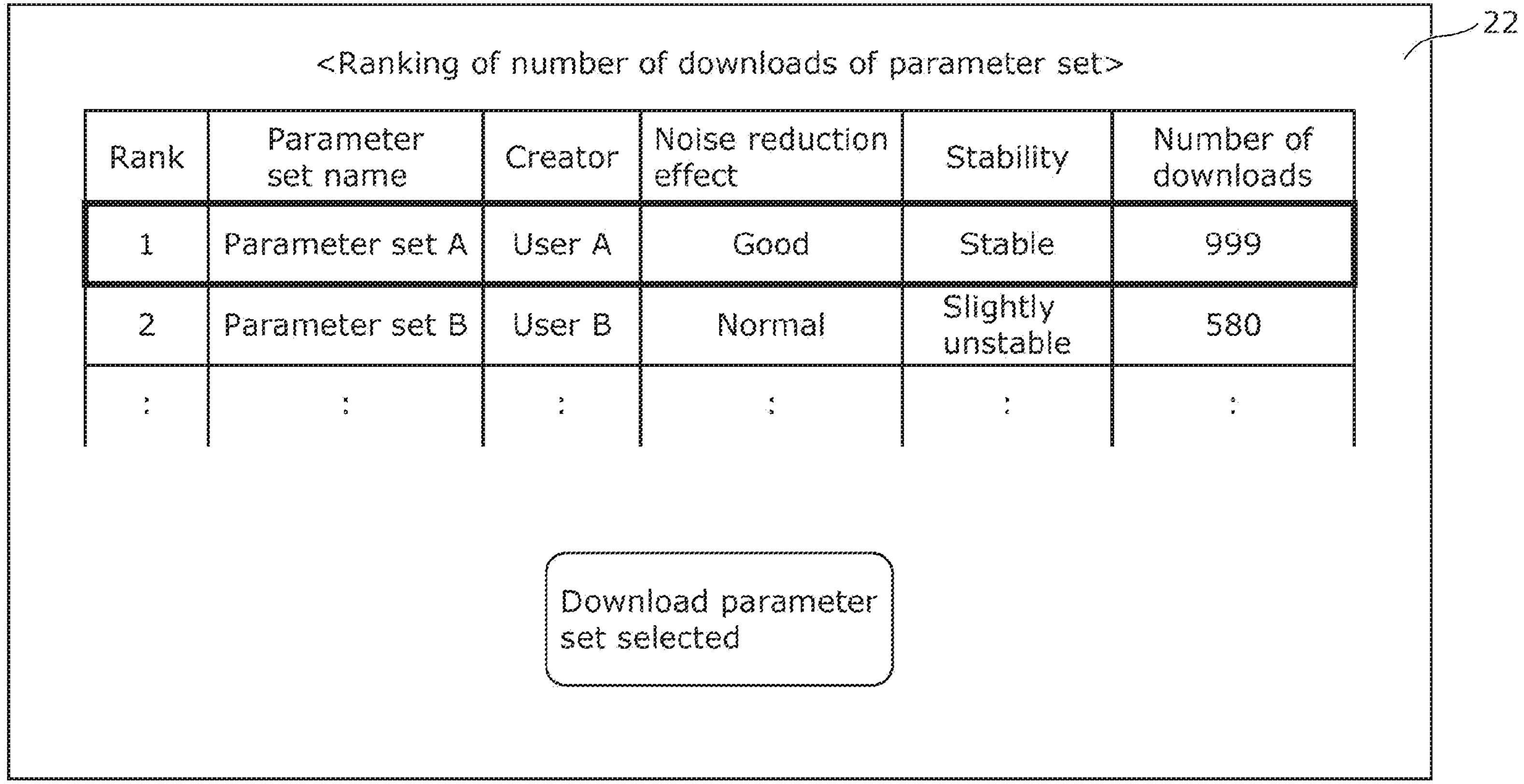
FIG. 13 illustrates an example of a download page for downloading a user-designated parameter set on a screen.

Display 22 of user interface device 20 displays a download page for downloading a user-designated parameter set on a screen (S71). FIG. 13 illustrates an example of a download page for downloading a user-designated parameter set on a screen. On the download page on the screen in FIG. 13, a list of user-designated parameter sets stored in storage 33 of server device 30 is displayed. More specifically, on the download page on the screen in FIG. 13, the user-designated parameter sets stored in storage 33 of server device are displayed in a ranking format in a descending order of the number of downloads. It should be noted that the user-designated parameter sets may be displayed in a ranking format according to an item other than the number of downloads, for example, in a descending order of noise reduction effect, or are not necessarily displayed in a ranking format. Here, the user-designated parameter sets are applicable to vehicles 50 of the same type (same car type).

A user performs an operation for downloading a user-designated parameter set (hereinafter, also referred to as a download operation) on operation receiver 21 of user interface device 20, and operation receiver 21 receives the download operation (S72). The download operation includes a selection operation for selecting one of the user-designated parameter sets.

When the download operation is received by operation receiver 21, information processor 24 transmits a download request for downloading the user-designated parameter set selected to server device 30 by using communicator 23 (S73).

Communicator 31 of server device 30 receives the download request. Parameter provider 34 transmits download information including the user-designated parameter set selected by the selection operation to active noise reduction device 40 by using communicator 31, based on the download request received (S74). In other words, parameter provider 34 provides the user-designated parameter set selected to active noise reduction device 40.

Communicator 42 of active noise reduction device 40 receives the download information. Obtainer 45 obtains the download information (S75), and causes signal processor 41 to reflect the user-designated parameter set included in the download information obtained. Signal processor 41 generates a cancelling signal by using the user-designated parameter set downloaded (S76).

As described above, active noise reduction system 10 includes storage 33 in which user-designated parameter sets created by a plurality of users other than a user are stored, and parameter provider 34 that provides one of the user-designated parameter sets to signal processor 41, based on a selection operation performed, by the user, on user interface device 20. When the selection operation is performed, the user-designated parameter sets are displayed in a ranking format on display 22. Accordingly, the user can apply a user-designated parameter set created by one of the plurality of other users other than the user to active noise reduction device 40.

It should be noted that, although download information is transmitted from server device 30 to active noise reduction device 40 in the example in FIG. 12, a communication path for transmitting download information is not particularly limited to this example. For example, user interface device 20 may receive download information from server device 30 and transmit the download information received to active noise reduction device 40. When download information is transmitted from user interface device 20 to active noise reduction device 40, a procedure shown in a sequence diagram of FIG. 3 is used, for example.

(Variation 1 of Functional Configuration of Active Noise Reduction System)

Figure 14:
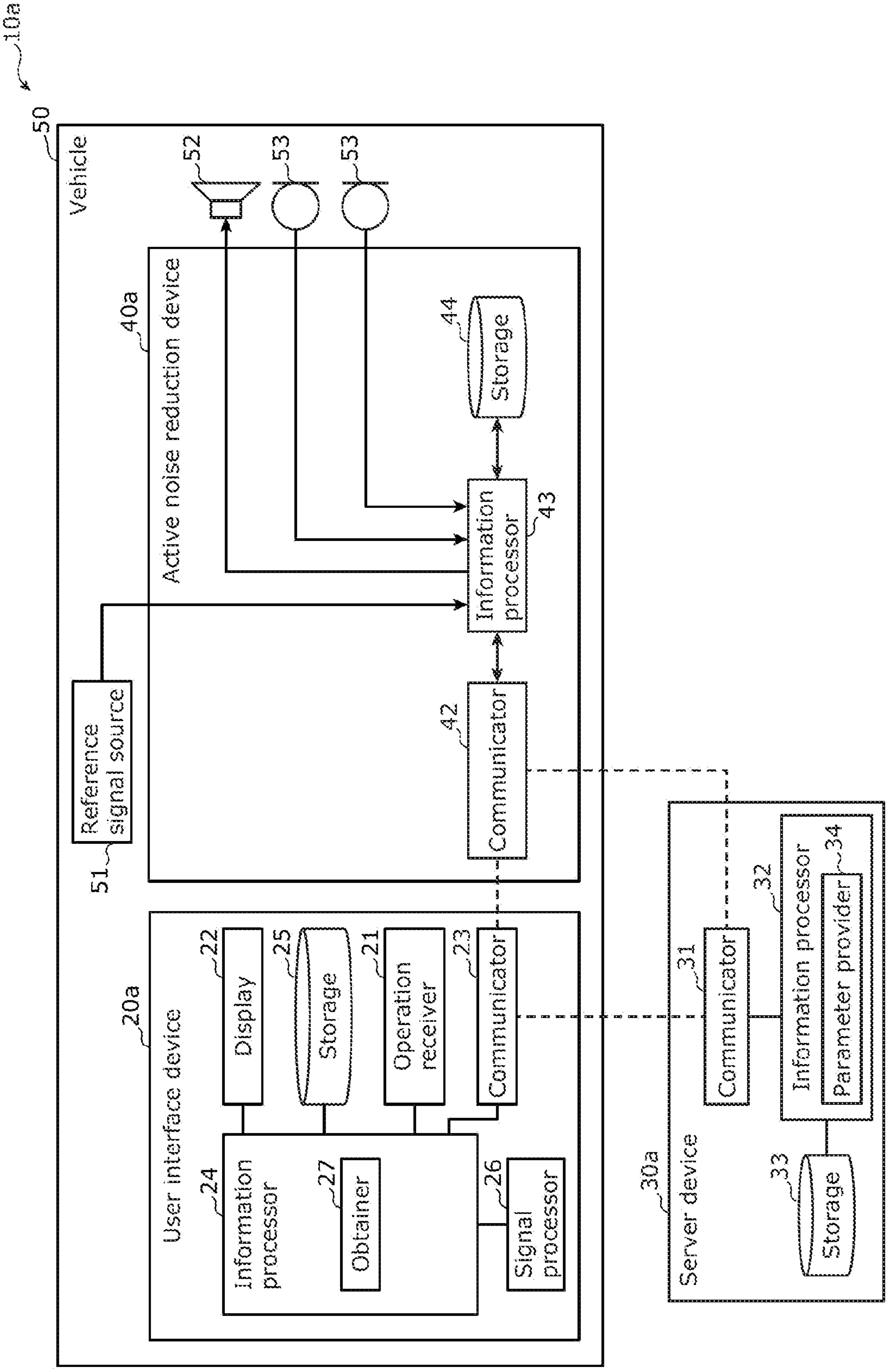
FIG. 14 illustrates a functional configuration of an active noise reduction system according to Variation 1.

In the above-described embodiment, substantial information processing related to generation of a cancelling sound is performed by active noise reduction device 40. In other words, active noise reduction system 10 is realized by active noise reduction device 40 including signal processor 41. However, the substantial information processing related to generation of a cancelling sound may also be performed by user interface device 20. FIG. 14 illustrates a functional configuration of an active noise reduction system according to Variation 1.

As illustrated in FIG. 14, active noise reduction system 10*a* includes user interface device 20*a*, server device 30*a*, active noise reduction device 40*a*, reference signal source 51, cancelling sound source 52, and error signal sources 53. In active noise reduction system 10*a*, user interface device 20*a* includes signal processor 26, and information processor 24 includes obtainer 27. In other words, the processing that has been described as being performed by active noise reduction device 40 in active noise reduction system 10 is performed by user interface device 20*a* in active noise reduction system 10*a*. Specifically, signal processor 41 and obtainer 45 in the above-described embodiment may be read as signal processor 26 and obtainer 27, respectively.

In this case, active noise reduction device 40*a* functions as a communication interface device for reference signal source 51, cancelling sound source 52, and error signal sources 53.

Thus, active noise reduction system 10*a* can be realized by user interface device 20*a* including signal processor 26 and obtainer 27.

(Variation 2 of Functional Configuration of Active Noise Reduction System)

Figure 15:
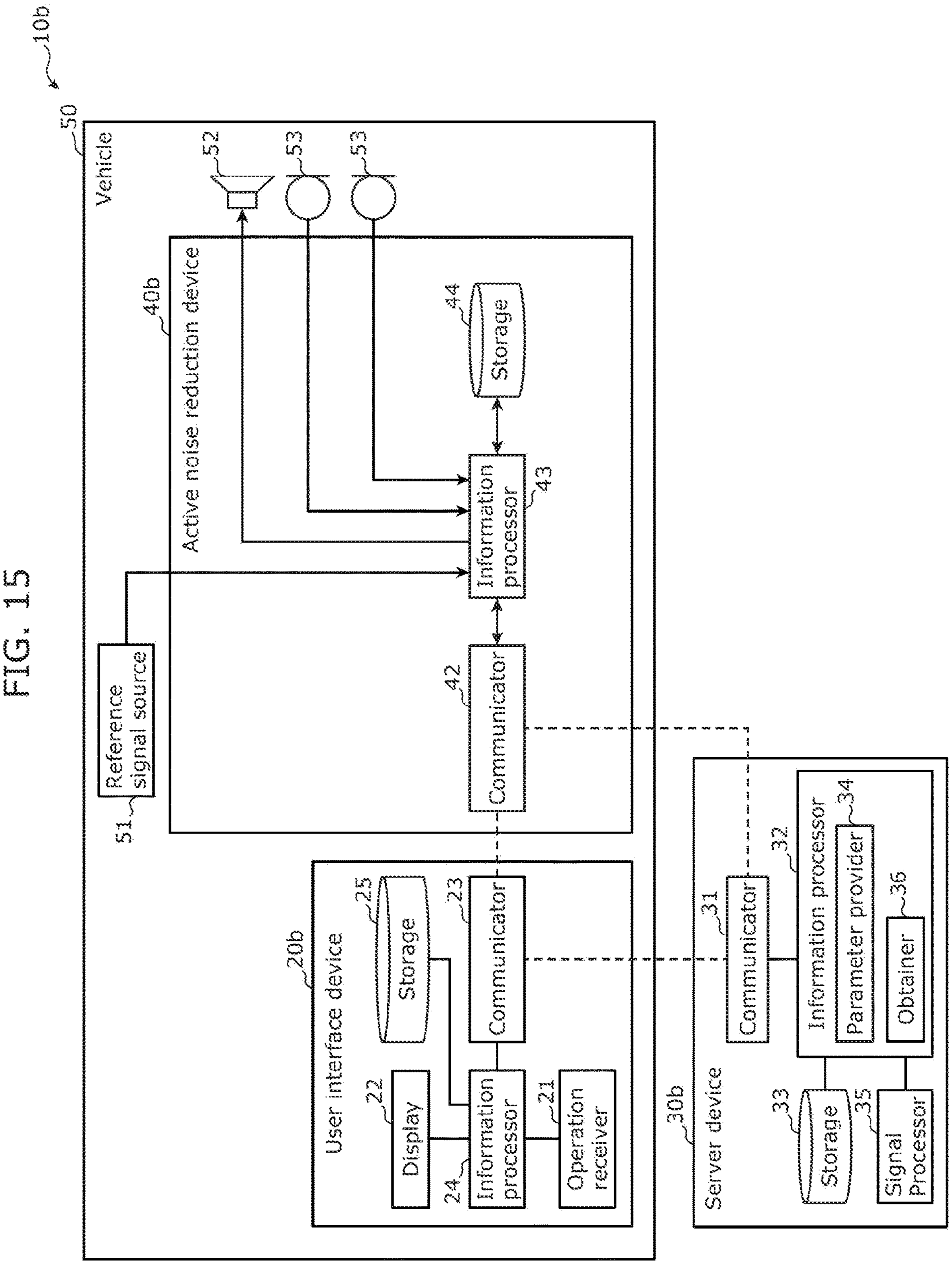
FIG. 15 illustrates a functional configuration of an active noise reduction system according to Variation 2.

The substantial information processing related to generation of a cancelling sound may also be performed by server device 30. FIG. 15 illustrates a functional configuration of an active noise reduction system according to Variation 2.

As illustrated in FIG. 15, active noise reduction system 10*b* includes user interface device 20*b*, server device 30*b*, active noise reduction device 40*b*, reference signal source 51, cancelling sound source 52, and error signal sources 53. In active noise reduction system 10*b*, server device 30*b* includes signal processor 35, and information processor 32 includes obtainer 36. In other words, the processing that has been described as being performed by active noise reduction device 40 in active noise reduction system 10 is performed by server device 30*b* in active noise reduction system 10*b*. Specifically, signal processor 41 and obtainer 45 in the above-described embodiment may be read as signal processor 35 and obtainer 36, respectively.

In this case, active noise reduction device 40*b* functions as a communication interface device for reference signal source 51, cancelling sound source 52, and error signal sources 53.

Thus, active noise reduction system 10*b* can be realized by server device 30*b* including signal processor 35 and obtainer 36.

(Variation of Signal Processor)

Figure 16:
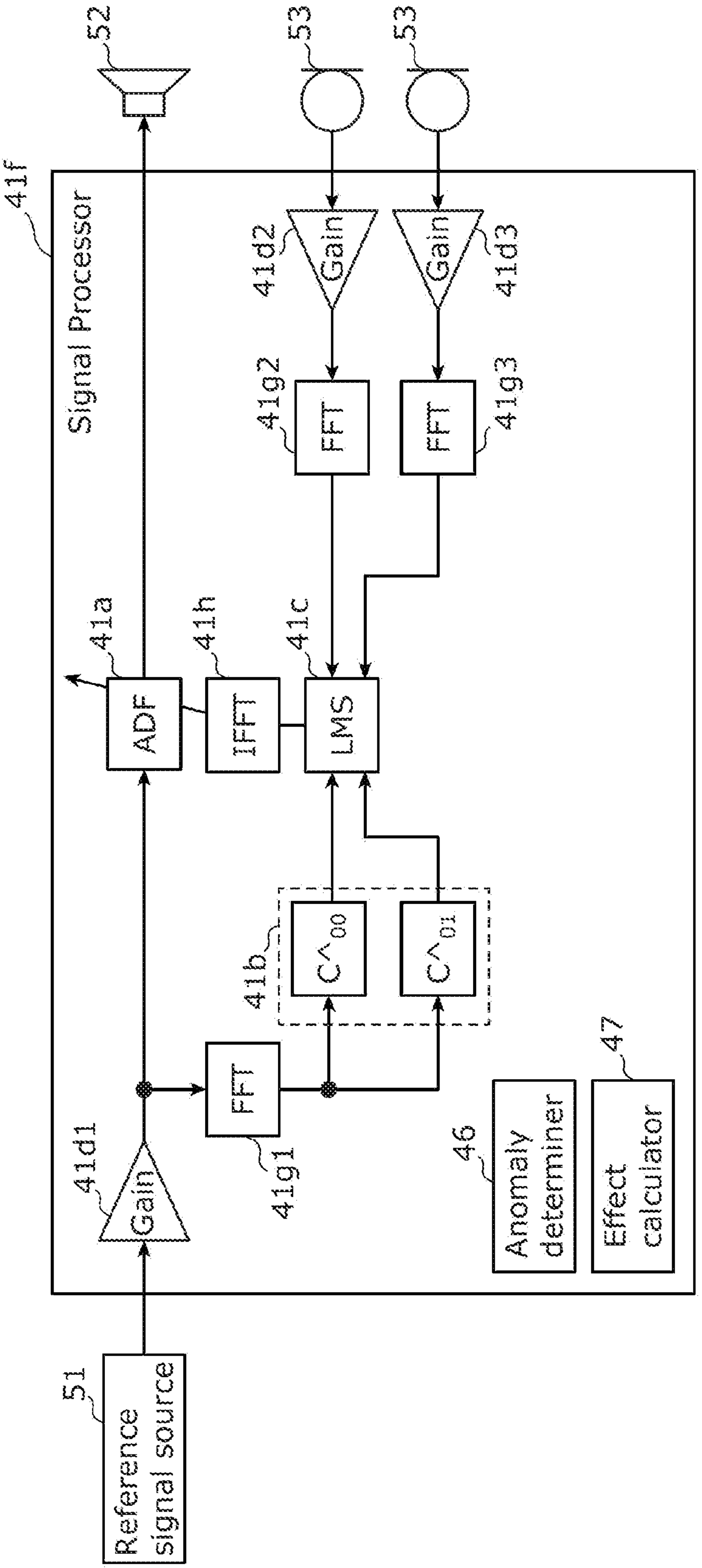
FIG. 16 illustrates a functional configuration of a signal processor according to a variation.

Signal processor 41 may be configured as illustrated in FIG. 16. FIG. 16 illustrates a functional configuration of signal processor 41*f* according to a variation.

As illustrated in FIG. 16, signal processor 41*f* specifically includes adaptive filter unit 41*a*, simulated acoustic transmission characteristic filter unit 41*b*, filter coefficient updater 41*c*, gain adjusters 41*d*1 to 41*d*3, Fourier transformers 41*g*1 to 41*g*3, and inverse Fourier transformer 41*h*.

Fourier transformer 41*g*1 performs a Fast Fourier Transform (FFT) on a reference signal that has been inputted to signal processor 41*f* and subjected to gain adjustment by gain adjuster 41*d*1.

Fourier transformer 41*g*2 (or Fourier transformer 41*g*3) performs a FFT on an error signal that has been outputted by error signal source 53 and subjected to gain adjustment by gain adjuster 41*d*2 (or gain adjuster 41*d*3).

Filter coefficient updater 41*c* calculates, for each frequency component, a coefficient of an adaptive filter by using Formula 1, Formula 2, or Formula 3.

Adaptive filter unit 41*a* multiplies each of frequency components of the reference signal by the filter coefficient, and inverse Fourier transformer 41*h* outputs a coefficient of an FIR filter by performing an Inverse Fast Fourier Transform (IFFT) on the filter coefficient. Adaptive filter unit 41*a* outputs a cancelling signal by convolving the reference signal in the time domain with the coefficient of the FIR filter.

In signal processor 41*f* as described above, a step-size parameter can be considered to be a vector including elements corresponding to frequency components. Although signal processor 41*f* does not include BPFs 41*e*1 to 41*e*3, adjustment equivalent to adjustment achieved by BPFs 41*e*1 to 41*e*3 can be realized by adjusting a step-size parameter.

It should be noted that a configuration similar to the configuration of signal processor 41*f* may be applied to signal processor 26 and signal processor 35.

Advantageous Effects

Hereinafter, techniques that can be obtained from the description of the present specification are exemplified, and the advantageous effects or the like that can be obtained by the techniques will be described.

Technique 1 is active noise reduction device 40 including: signal processor 41 that generates a cancelling signal for outputting a cancelling sound for reducing noise in an interior of vehicle 50, by applying an adaptive filter to a reference signal having a correlation with the noise, the adaptive filter having a coefficient that is updated based on an error signal indicating a state of the noise when the cancelling sound is being outputted; and communicator 42 that receives a change request for changing a parameter set related to generation of the cancelling signal to a user-designated parameter set that is designated by a user, wherein signal processor 41 generates the cancelling signal by using the user-designated parameter set based on the change request received. Vehicle 50 is an example of a moving body device.

Such an active noise reduction device 40 is capable of reducing noise in the interior of vehicle 50 by using a user-designated parameter set. In other words, active noise reduction device 40 can adjust parameters used for generation of a cancelling signal.

Technique 2 is active noise reduction device 40 according to technique 1, wherein the parameter set includes at least one of a gain coefficient by which the reference signal is multiplied, a gain coefficient by which the error signal is multiplied, or a step-size parameter for determining an update amount of the coefficient of the adaptive filter.

Such an active noise reduction device 40 is capable of reducing noise in the interior of vehicle 50 by using at least one of a gain coefficient by which a reference signal is multiplied, a gain coefficient by which an error signal is multiplied, or a step-size parameter for determining an update amount of a coefficient of an adaptive filter, as designated by a user.

Technique 3 is active noise reduction device 40 according to technique 1 or 2, wherein the parameter set includes a characteristic of a band pass filter (BPF) that is applied to the reference signal and a characteristic of a BPF that is applied to the error signal.

Such an active noise reduction device 40 is capable of reducing noise in the interior of vehicle 50 by using a characteristic of a BPF that is applied to a reference signal and a characteristic of a BPF that is applied to an error signal, as designated by a user.

Technique 4 is active noise reduction device 40 according to any of techniques 1 to 3, wherein signal processor 41 further includes anomaly determiner 46 that determines whether an anomaly is present or absent based on at least one of the coefficient of the adaptive filter, an update amount of the coefficient of the adaptive filter, or a signal level of the cancelling signal, and anomaly determiner 46 outputs information indicating a determination result when anomaly determiner 46 determines that an anomaly is present.

Such an active noise reduction device 40 can notify a user of whether an anomaly is present or absent in noise control.

Technique 5 is active noise reduction device 40 according to technique 4, wherein anomaly determiner 46 performs a fail-safe process when anomaly determiner 46 determines that the anomaly is present, and the fail-safe process includes at least one of a process for stopping output of the cancelling sound or a process for resetting the coefficient of the adaptive filter.

Such an active noise reduction device 40 can prevent a cancelling sound from becoming an anomalous sound, by a fail-safe process.

Technique 6 is active noise reduction device 40 according to technique 4 or 5, wherein while the cancelling signal is generated by using the user-designated parameter set, anomaly determiner 46 changes a determination criterion for determining whether an anomaly is present or absent to increase a likelihood of determining that an anomaly is present.

Such an active noise reduction device 40 can prevent an occurrence of an anomalous sound in an early stage (with sufficient time) even when an inappropriate user-designated parameter set is used.

Technique 7 is active noise reduction device 40 according to technique 4 or 5, wherein while the cancelling signal is generated by using the user-designated parameter set, anomaly determiner 46 changes a determination criterion for determining whether an anomaly is present or absent to decrease a likelihood of determining that an anomaly is present.

With such an active noise reduction device 40, an effect of causing a user to easily perceive an occurrence of an anomaly caused by a user-designated parameter set can be obtained.

Technique 8 is active noise reduction device 40 according to technique 5, wherein while the cancelling signal is generated by using the user-designated parameter set, anomaly determiner 46 extends a period of time from when the anomaly is determined to be present to when the fail-safe process is performed.

With such an active noise reduction device 40, an effect of causing a user to easily perceive an occurrence of an anomaly caused by a user-designated parameter set can be obtained by slightly destabilizing noise control on purpose.

Technique 9 is active noise reduction device 40 according to any of techniques 1 to 8, wherein signal processor 41 includes effect calculator 47 that calculates a noise reduction effect of the cancelling sound, and effect calculator 47 outputs information indicating the noise reduction effect calculated.

Such an active noise reduction device 40 can notify a user of a noise reduction effect.

Technique 10 is active noise reduction device 40 according to any of techniques 1 to 9, wherein communicator 42 receives the change request outputted by user interface device 20 based on an operation performed, by the user, on user interface device 20.

With such an active noise reduction device 40, a user can change a parameter set related to generation of a cancelling signal to a user-designated parameter set based on an operation performed, by the user, on user interface device 20.

Technique 11 is active noise reduction system 10 including active noise reduction device 40 according to any of techniques 1 to 10, server device 30, and user interface device 20, wherein server device 30 includes: storage 33 that stores a plurality of user-designated parameter sets created by a plurality of users other than the user; and parameter provider 34 that provides one of the plurality of user-designated parameter sets to signal processor 41 based on a selection operation performed, by the user, on user interface device 20.

Such an active noise reduction device 10 is capable of reducing noise in the interior of vehicle 50 by using a user-designated parameter set created by an other user.

Technique 12 is active noise reduction system 10 according to Technique 11, wherein the plurality of user-designated parameter sets are displayed in a ranking format on user interface device 20.

Such an active noise reduction system 10 can support a user to select one of user-designated parameter sets created by a plurality of users other than the user.

Technique 13 is an active noise reduction method that is executed by a computer. The active noise reduction method includes: generating a cancelling signal for outputting a cancelling sound for reducing noise in an interior of vehicle 50, by applying an adaptive filter to a reference signal having a correlation with the noise, the adaptive filter having a coefficient that is updated based on an error signal indicating a state of the noise when the cancelling sound is being outputted; receiving a change request for changing a parameter set related to generation of the cancelling signal to a user-designated parameter set that is designated by a user; and generating the cancelling signal by using the user-designated parameter set based on the change request received.

Such an active noise reduction method is capable of reducing noise in the interior of vehicle 50 by using a user-designated parameter set. In other words, the active noise reduction method can adjust parameters used for generation of a cancelling signal.

Other Embodiments

Although an embodiment has been described hereinabove, the present disclosure is not limited to the above-described embodiment.

For example, the active noise reduction system may be realized by a plurality of devices (such as a user interface device, a server device, and an active noise reduction device) or by a single device (such as any of a user interface device, a server device, or an active noise reduction device). When the active noise reduction system is realized by a plurality of devices, the constituent elements (particularly, functional constituent elements) included in the active noise reduction system may be arbitrarily assigned to the plurality of devices.

Moreover, although the active noise reduction system is a system that performs noise control based on a Filtered-X LMS algorithm in the embodiment, the active noise reduction system may be realized as a system that performs noise control using a Single-frequency Adaptive Notch (SAN) filter algorithm or a SAN Filtered-x LMS algorithm.

Moreover, the active noise reduction device according to the embodiment may be installed in a moving body device other than a vehicle. For example, the moving body device may be an aircraft or a watercraft. Moreover, the present disclosure may be realized as such a moving body device other than a vehicle.

Moreover, the configuration of the active noise reduction device according to the embodiment is an example. For example, the active noise reduction device may include a constituent element such as a D/A converter, a filter, a power amplifier, or an A/D converter.

Moreover, the processing performed by the active noise reduction device according to the embodiment is an example. For example, part of a digital signal processing described in the embodiment may be implemented by an analog signal processing.

Moreover, for example, the processing performed by a particular processor in the embodiment may be performed by another processor. Moreover, the processing order of a plurality of processes may be changed, and a plurality of processes may be performed in parallel.

Moreover, in the embodiment, each of the constituent elements may be realized by executing a software program suitable for each of the constituent elements. Each of the constituent elements may be realized by a program executor, such as a CPU or processor, retrieving and executing a software program stored in a storage medium, such as a hard disk or a semiconductor memory device.

Moreover, in the embodiment, each of the constituent elements may be realized by hardware. For example, each of the constituent elements may be a circuit (or an integrated circuit). These circuits may be configured as a single circuit or may be individual circuits. Moreover, these circuits may be ordinary circuits or specialized circuits.

Moreover, each of the constituent elements may be a circuit (or an integrated circuit). These circuits may be configured as a single circuit or may be individual circuits. Moreover, these circuits may be ordinary circuits or specialized circuits.

Moreover, general or specific aspects of the present disclosure may be realized as a system, device, method, integrated circuit, computer program, or non-transitory computer readable recording medium, such as a CD-ROM. Moreover, general or specific aspects of the present disclosure may be realized as an arbitrary combination of a system, method, integrated circuit, computer program, and non-transitory computer readable recording medium.

For example, the present disclosure may be realized as an active noise reduction method executed by an active noise reduction device (a computer or DSP), or as a program for causing a computer or DSP to execute the active noise reduction method. Moreover, the present disclosure may be realized as an application program to be installed in a user interface device. Moreover, the present disclosure may be realized as a non-transitory computer readable recording medium having these programs recorded thereon.

For other examples, forms obtained by making various modifications to the above-described embodiment that can be conceived by a person skilled in the art, as well as other forms realized by arbitrarily combining some constituent elements and functions in the above-described embodiment, without departing from the essence of the present disclosure, are included in the scope of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings and claims are incorporated herein by reference in its entirety: Japanese Patent Application No. 2022-132994 filed on Aug. 24, 2022.

INDUSTRIAL APPLICABILITY

For example, an active noise reduction device of the present disclosure is applicable as a device that is capable of reducing noise in the interior of a vehicle.

The invention claimed is:

1. An active noise reduction device, comprising:

a signal processor that generates a cancelling signal for outputting a cancelling sound for reducing noise in an interior of a moving body device, by applying an adaptive filter to a reference signal having a correlation with the noise, the adaptive filter having a coefficient that is updated based on an error signal indicating a state of the noise when the cancelling sound is being outputted; and a communicator that receives a change request for changing a parameter set related to generation of the cancelling signal to a user-designated parameter set that is designated by a user, wherein the signal processor generates the cancelling signal by using the user-designated parameter set based on the change request received, the signal processor determines whether an anomaly is present or absent based on at least one of the coefficient of the adaptive filter, an update amount of the coefficient of the adaptive filter, or a signal level of the cancelling signal, the signal processor outputs information indicating a determination result when the signal processor determines that the anomaly is present, and while the cancelling signal is generated by using the user-designated parameter set, the signal processor changes a determination criterion for determining whether the anomaly is present or absent to increase a likelihood of determining that the anomaly is present.

2. The active noise reduction device according to claim 1, wherein the parameter set includes at least one of a gain coefficient by which the reference signal is multiplied, a gain coefficient by which the error signal is multiplied, or a step-size parameter for determining an update amount of the coefficient of the adaptive filter.

3. The active noise reduction device according to claim 1, wherein the parameter set includes a first characteristic of a first band pass filter (BPF) that is applied to the reference signal and a second characteristic of a second BPF that is applied to the error signal.

4. The active noise reduction device according to claim 1, wherein the signal processor performs a fail-safe process when the anomaly is determined to be present, and the fail-safe process includes at least one of a first process for stopping output of the cancelling sound or a second process for resetting the coefficient of the adaptive filter.

5. The active noise reduction device according to claim 4, wherein while the cancelling signal is generated by using the user-designated parameter set, the signal processor extends a period of time from when the anomaly is determined to be present to when the fail-safe process is performed.

6. The active noise reduction device according to claim 1, wherein the signal processor calculates a noise reduction effect of the cancelling sound, and the signal processor outputs information indicating the noise reduction effect.

7. The active noise reduction device according to claim 1, wherein the communicator receives the change request from a user interface device based on an operation performed, by the user, on the user interface device.

8. An active noise reduction system comprising:

the active noise reduction device according to claim 1;

a server device; and a user interface device, wherein the server device:

stores a plurality of user-designated parameter sets created by a plurality of users other than the user; and provides one of the plurality of user-designated parameter sets to the signal processor based on a selection operation performed, by the user, on the user interface device.

9. The active noise reduction system according to claim 8, wherein the plurality of user-designated parameter sets is displayed in a ranking format on the user interface device.

10. An active noise reduction method that is executed by a computer, the active noise reduction method comprising:

generating a cancelling signal for outputting a cancelling sound for reducing noise in an interior of a moving body device, by applying an adaptive filter to a reference signal having a correlation with the noise, the adaptive filter having a coefficient that is updated based on an error signal indicating a state of the noise when the cancelling sound is being outputted;

receiving a change request for changing a parameter set related to the generating of the cancelling signal to a user-designated parameter set that is designated by a user;

generating the cancelling signal by using the user-designated parameter set based on the change request received;

determining whether an anomaly is present or absent based on at least one of the coefficient of the adaptive filter, an update amount of the coefficient of the adaptive filter, or a signal level of the cancelling signal;

outputting information indicating a determination result when the anomaly is determined to be present; and while the cancelling signal is generated by using the user-designated parameter set, changing a determination criterion for the determining of whether the anomaly is present or absent to increase a likelihood of determining that the anomaly is present.

11. The active noise reduction device according to claim 1, wherein the signal processor performs a fail-safe process when the anomaly is determined to be present, the fail-safe process includes at least one of a first process for stopping output of the cancelling sound or a second process for resetting the coefficient of the adaptive filter, and while the cancelling signal is generated by using the user-designated parameter set, a period of time from when the anomaly is determined to be present to when the fail-safe process is performed is extended.

12. An active noise reduction device, comprising:

a processor; and a memory including a program that, when executed by the processor, causes the processor to:

generate a cancelling signal for outputting a cancelling sound for reducing noise in an interior of a moving body device, by applying an adaptive filter to a reference signal having a correlation with the noise, the adaptive filter having a coefficient that is updated based on an error signal indicating a state of the noise when the cancelling sound is being outputted;

receive a change request for changing a parameter set related to generation of the cancelling signal to a user-designated parameter set that is designated by a user;

generate the cancelling signal by using the user-designated parameter set based on the change request;

determine whether an anomaly is present or absent based on at least one of the coefficient of the adaptive filter, an update amount of the coefficient of the adaptive filter, or a signal level of the cancelling signal;

output information indicating a determination result when the anomaly is present; and while the cancelling signal is generated by using the user-designated parameter set, change a determination criterion for determining whether the anomaly is present or absent to increase a likelihood of determining that the anomaly is present.

* * * * *